United States Patent [19]

Hoshikawa

[11] Patent Number: 4,597,635
[45] Date of Patent: Jul. 1, 1986

[54] LIQUID CRYSTAL DISPLAY DEVICE AND A METHOD OF MANUFACTURING THE SAME FROM A FOLDED PLASTIC SHEET

[75] Inventor: Jun Hoshikawa, Shiojiri, Japan

[73] Assignee: Epson Corporation, Tokyo, Japan

[21] Appl. No.: 565,258

[22] Filed: Dec. 23, 1983

[30] Foreign Application Priority Data

Dec. 23, 1982 [JP] Japan .................. 57-228180
Dec. 23, 1982 [JP] Japan .................. 57-228181
Oct. 21, 1983 [JP] Japan .................. 58-197002

[51] Int. Cl.⁴ .............................................. G02F 1/13
[52] U.S. Cl. .................. 350/334; 350/339 R; 350/341; 350/336
[58] Field of Search ............ 350/331 R, 332, 333, 350/334, 339 R

[56] References Cited

U.S. PATENT DOCUMENTS

| 4,362,771 | 12/1982 | Umeda et al. .............. 350/344 X |
| 4,418,987 | 12/1983 | Takanashi et al. .......... 350/337 |
| 4,426,133 | 1/1984 | Funada et al. ............. 350/337 X |
| 4,474,432 | 10/1984 | Takamatsu et al. ......... 350/332 X |

FOREIGN PATENT DOCUMENTS

| 50-131796 | 10/1975 | Japan . |
| 50-36542 | 10/1975 | Japan . |
| 50-36993 | 10/1975 | Japan . |
| 51-15426 | 5/1976 | Japan . |
| 53-117450 | 10/1978 | Japan .................. 350/334 |
| 54-8543 | 1/1979 | Japan . |
| 56-20556 | 5/1981 | Japan . |
| 56-116011 | 9/1981 | Japan .................. 350/334 |
| 57-181527 | 11/1982 | Japan . |
| 57-205711 | 12/1982 | Japan .................. 350/334 |
| 58-85416 | 5/1983 | Japan .................. 350/334 |

Primary Examiner—John K. Corbin
Assistant Examiner—Richard F. Gallivan
Attorney, Agent, or Firm—Blum Kaplan Friedman Silberman & Beran

[57] ABSTRACT

A liquid crystal display device formed from a flexible substrate sheet having two driving electrode patterns disposed on one surface of the sheet is provided. The sheet is treated for orientation and folded along a fold line between the electrode patterns. The electrode patterns overlap in plan view when the sheet is folded to form the display device. One segment of the folded sheet extends beyond the other segment to form a terminal region for both electrode patterns.

30 Claims, 60 Drawing Figures

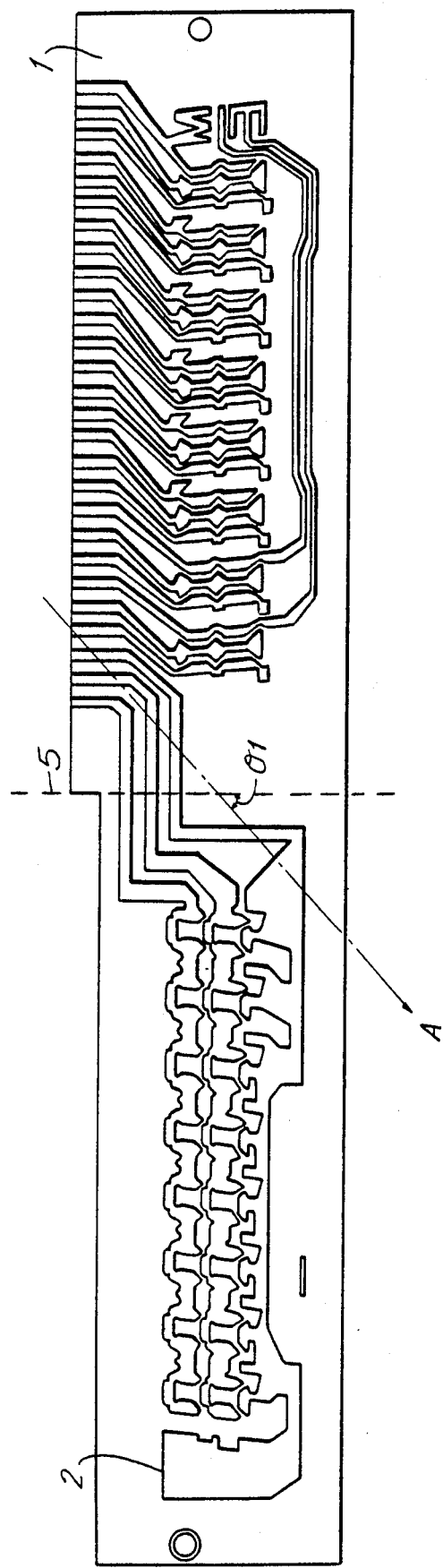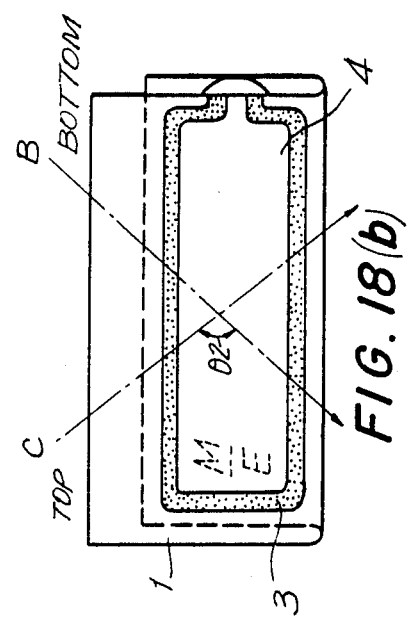
FIG.18(a)
FIG.18(b)

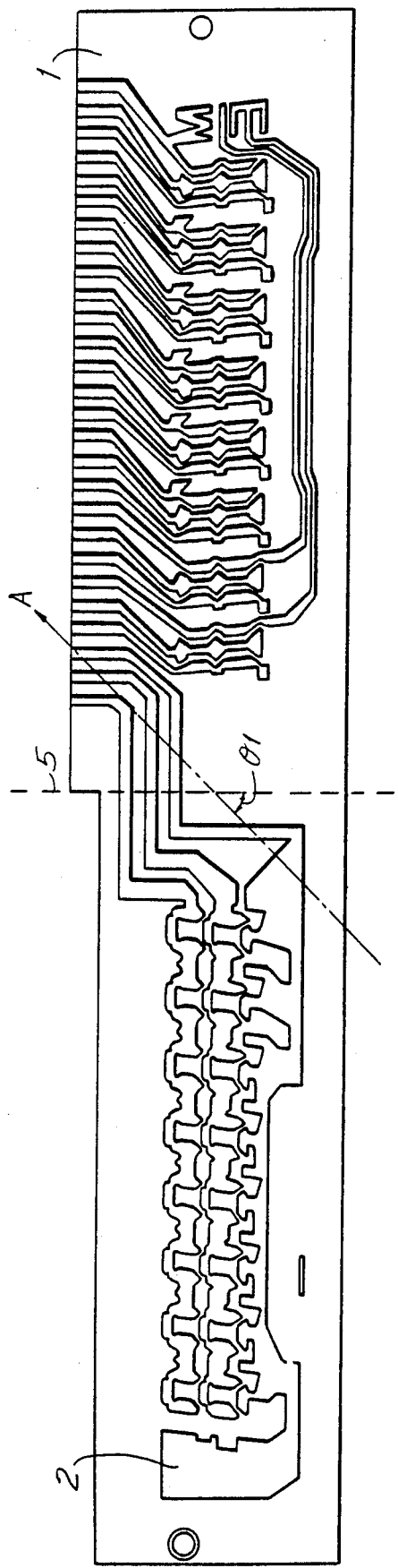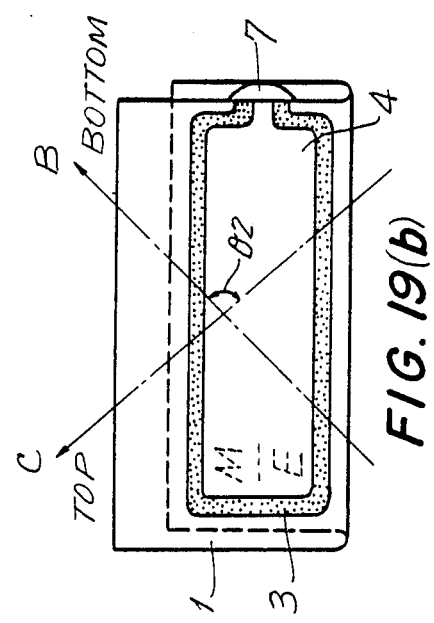
FIG.19(a)
FIG.19(b)

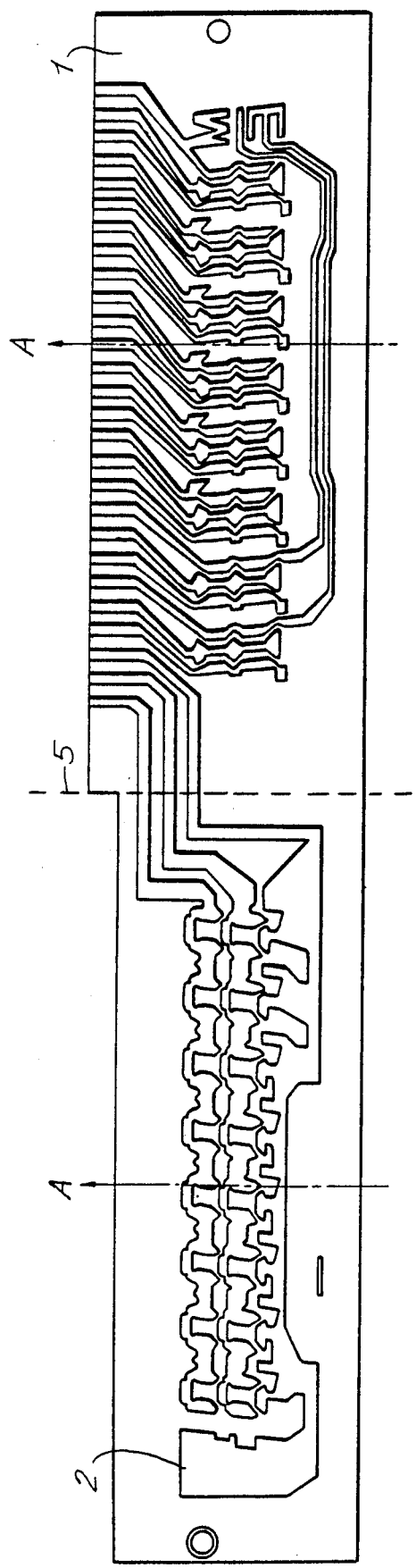
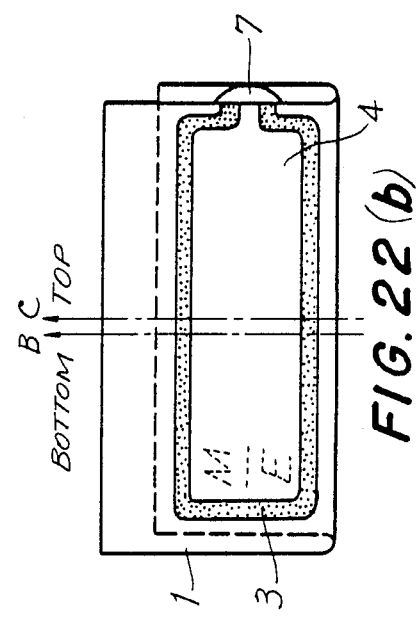
FIG. 22(a)
FIG. 22(b)

LIQUID CRYSTAL DISPLAY DEVICE AND A METHOD OF MANUFACTURING THE SAME FROM A FOLDED PLASTIC SHEET

BACKGROUND OF THE INVENTION

This invention relates to a liquid crystal display device having a flexible substrate and a method for manufacturing the device. More particularly, this invention relates to a liquid crystal display device having flexible electrode substrates between which a liquid crystal is disposed. The flexible electrode substrates are electrically connected to each other without the use of a conductor such as silver paste.

Liquid crystal display devices having glass substrates are well known. An electrode is spaced apart from a substrate by a liquid crystal. The electrode has a terminal and is electrically connected by a conductor to an electrode for the substrate on the terminal side. In this construction the reliability of the liquid crystal panel depends upon the reliability of the conductor. In practice, an electrically conductive adhesive is used as a conductor. However, this is not fully satisfactory since the adhesive often separates from the substrates. Additionally, the conventional devices are expensive to manufacture since a large amount of circuit printing and drying is required in order to form the conductors.

Accordingly, it is desirable to provide a liquid crystal display device which overcomes these problems.

SUMMARY OF THE INVENTION

Generally speaking, in accordance with the invention, a liquid crystal display device wherein the substrates are formed on a single sheet of flexible material with the electrode patterns formed on the sheet in a common plane and folded to provide an electrode terminal side and an opposed pattern side is provided. The substrate is then folded to provide a liquid crystal panel which does not require an interconnecting electrical connection between the two panels. Thus, the electrical connection of the invention is highly reliable, since the substrate is so folded as to define an inside diameter which is at least equal to the thickness of the device.

It is thus an object of the invention to provide an improved liquid crystal display device.

It is another object of the invention to provide an improved method for fabricating a liquid crystal display device using a single sheet of flexible material.

It is a principal object of the invention to eliminate the problem of conductor separation and to provide a liquid crystal display device which is highly reliable and which has an electrical connection between the electrode substrates.

Yet another object of the invention to provide a liquid crystal display device which is inexpensive to manufacture and which employs an assembly other than a conductor for use in making an electrical connection between the opposed liquid crystal electrode substrates, thereby eliminating the large amount of effort required for the formation of the conductor, including the steps of printing and drawing.

Still other objects and advantages of the invention will in part be obvious and will in part be apparent from the specification.

The invention accordingly comprises the features of construction, combination of elements and arrangement of parts which will be exemplified in the construction hereinafter set forth, and the steps and the relation of one or more of such steps with respect to each of the others, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 12(a)–25(a) each is a plan view of a substrate sheet in an unfolded condition according to the invention;

FIGS. 12(b)–25(b) each is a plan view of a liquid crystal display device made from the sheets of FIGS. 12(a)–25(a), respectively according to the invention;

DETAILED DESCRIPTION OF THE PREFERRED EMBODIMENTS

Figure 1:
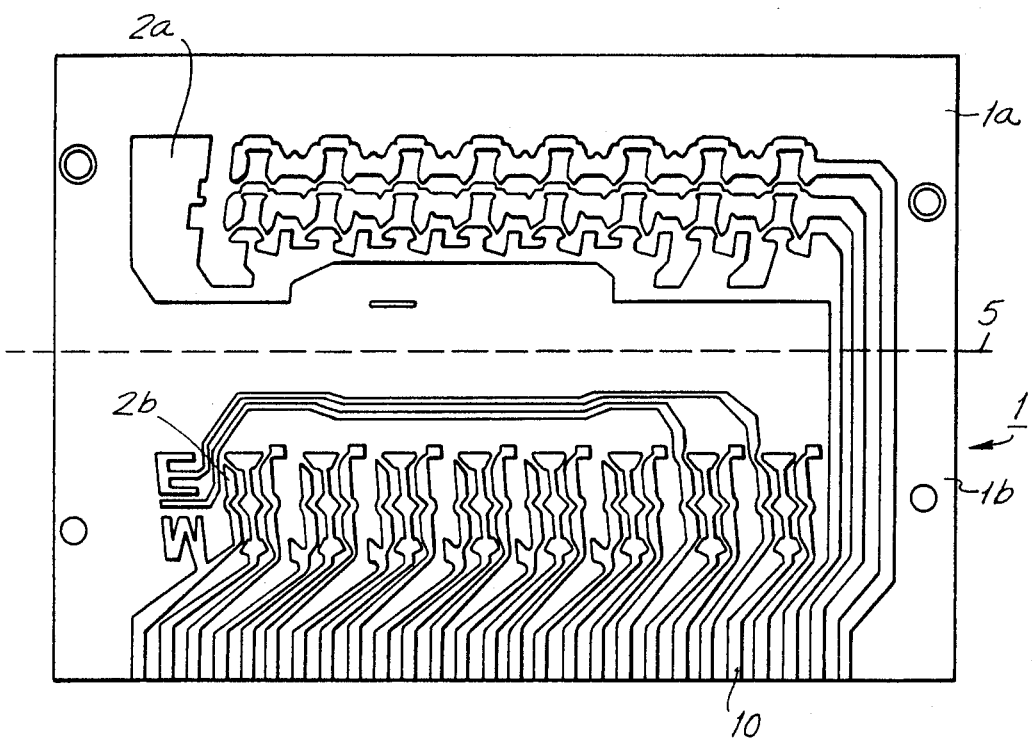
FIG. 1 is a plan view of a substrate sheet in an unfolded condition for a liquid crystal display device in accordance with the invention.

The liquid crystal display device of the invention is formed from a flexible substrate sheet which is folded to form the opposed substrates of the display device. The substrate sheet is formed from a synthetic resin, such as a polyester, a cellulosic resin, phenoxy resin, polyethersulfone or a polysulfone or an acrylic resin. In addition, the substrate may be formed from a film or films of at least one of the resins. A polarizing film may also be attached to the substrate. In addition, the polarizing film may comprise a PVA film containing a dichroic dye having a polarizing power, or a combination of any such PVA film and a cellulose acetate film or a K film. Alternatively, the substrate itself may be formed from such a polarizing film. The substrate may have an aluminum foil or aluminum film bonded thereto, or the substrate may have a layer of aluminum or silver applied to it by an evaporation or sputtering process. The substrate may have a thickness of about 0.025 to 1.5 mm. In practice, a substrate thickness of about 0.025 to 1 mm is preferred in order to form a satisfactorily thin liquid crystal panel. However, a substrate having a thickness of about 0.05 to 0.2 mm is easier to manufacture. In this way, the flexible substrate sheet can be folded without cracking or causing an electrode pattern disposed thereon to break.

A flexible substrate sheet in accordance with the invention is coated with a transparent conductive film which may be formed from $SnO_2$, $In_2O_3$ or a mixture of $SnO_2$ and $In_2O_3$ (ITO). The ITO mixture has a mixing ratio of $SnO_2$ : $In_2O_3$ in the range of 0.05 to 200. The transparent conductive film may have a thickness of 100 to 700 A. The transparent conductive film is deposited on the substrate by, for example, a sputtering or evaporation process. The transparent conductive film has a predetermined pattern formed by, for example, a chemical ion beam or plasma etching process. An orientation film is then formed on that side of the substrate which faces a liquid crystal layer. It may be formed from a polyimide, polyamide or polyimide-amide resin having a thickness of between 5 and 700 A. The orientation film is treated for orientation by rubbing. In the alternate, a film of $SiO_2$ may be deposited by evaporation onto the substrate in an inclined pattern, and then treated for orientation.

The electrode patterns on the upper and lower electrode substrates become aligned with each other when the substrate sheet is folded. Alternatively, aligning marks may be provided on the upper and lower electrode portions to facilitate the proper folding of the substrate sheet. Additionally, the outside perimeter of the substrate may be used as a reference for folding. After the substrate sheet has been folded, the upper and lower substrates of the cell are compressed into a predetermined cell thickness. They are then joined to each other by a sealing agent, and the space defined therebetween is filled with a liquid crystal material. The inlet for the liquid crystal material is then closed, whereupon a liquid crystal panel is obtained.

A number of embodiments of the invention will now be described by way of example.

EXAMPLE A-1

Figure 2:
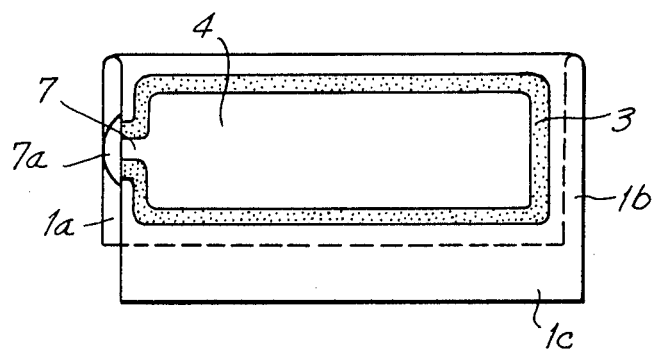
FIG. 2 is a plan view of a liquid crystal display device of the invention.

Referring to FIGS. 1 and 2, a transparent conductive film of indium oxide having a thickness of 300 A was deposited on a polyester substrate sheet 1 having a thickness of 100 A by ion sputtering. A common electrode pattern 2a was formed on common portion electrode 1a and a signal electrode pattern 2b was formed on signal electrode portion 1b by photolithography.

Signal electrode pattern 2b on signal electrode portion 1b of substrate sheet 1 and common electrode pattern 2a on common electrode portion 1a include terminal leads 10 which are formed on an overhanging or a terminal portion 1c of substrate sheet 1.

An orientation layer of a polyimide resin having a thickness of 50 A was applied onto substrate 1 and was calcined at 150° C. for an hour. The orientation layer was rubbed with gauze in a slanting direction for orientation. An epoxy adhesive 3 was applied as a sealing agent about the perimeter of common electrode portion (a) and formed with an inlet 7 by a screen printing technique and glass fiber fragments were scattered thereon. Substrate sheet 1 was folded along broken line 5, and sealing agent 3 was cured by heating. The space defined within the folded substrate was filled with a liquid crystal material 4 by vacuum injection, and the inlet for the liquid crystal material was sealed with a silicone resin 7a. This forms a liquid crystal cell as shown in FIG. 2.

EXAMPLE A-2

Figure 3:
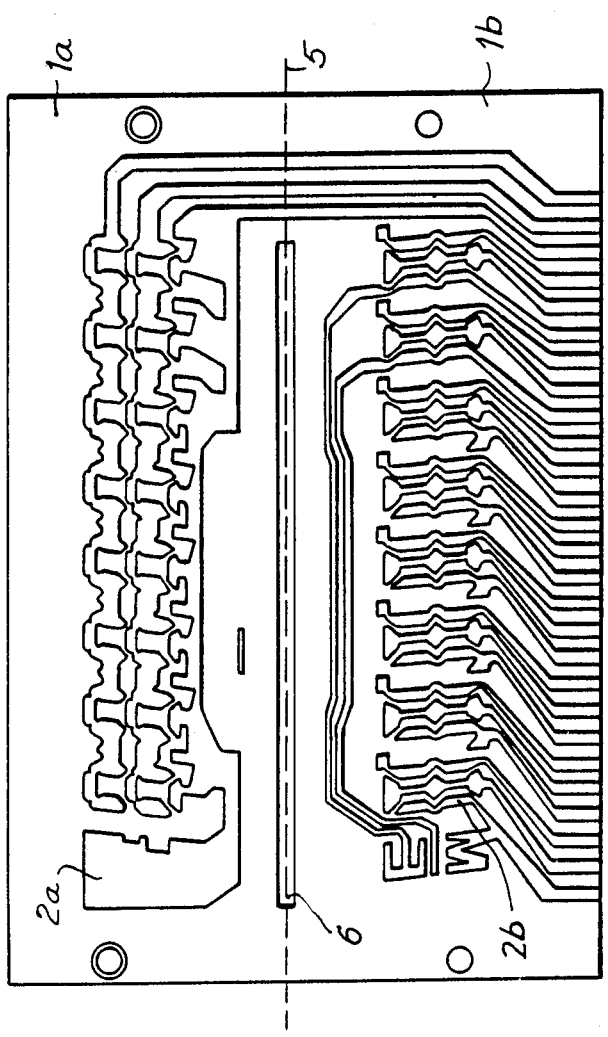
FIG. 3 is a plan view of a substrate sheet in an unfolded condition for another embodiment of a liquid crystal device of the invention.

The procedures of EXAMPLE A-1 prior to applying epoxy adhesive 3 were repeated to make substrate sheet 1 as shown in FIG. 1. Then, an elongated opening 6 as shown in FIG. 3 was formed along folding line 5 between common electrode portion 1a and signal electrode portion 1b.

EXAMPLE A-3

Figure 4:
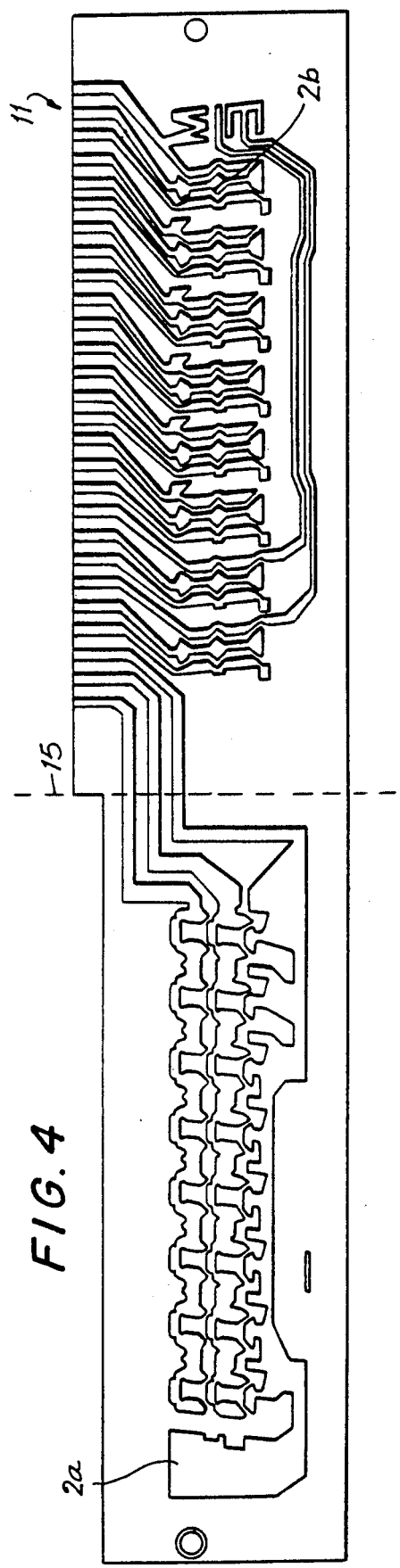
FIG. 4 is a plan view of a substrate sheet in an unfolded condition for a liquid crystal display device of a further embodiment of the invention.

Referring to FIG. 4 the procedures of EXAMPLE A-1 for making a liquid crystal panel substrate sheet 1 were followed; however, an elongated substrate sheet 11 was used. Substrate sheet 11 was then folded at its mid-portion along a folding line 15 to provide a liquid crystal display panel.

The procedures defined in EXAMPLES A-1 through A-3 were repeated for making the following liquid crystal panels.

1. Substrate sheet 1 was formed from a phenoxy resin having a thickness of 0.05 mm;
2. Substrate sheet 1 was formed from a polyethersulfone resin having a thickness of 0.04 mm and a silicone resin was used as sealing agent 3;
3. Substrate sheet 1 was formed from a polysulfone resin having a thickness of 0.07 mm; and
4. A polarizing plate having a thickness of 0.8 mm was used as substrate sheet 1. Polarizing plate 1 was a PVA film dyed with a dichroic pigment sandwiched between a pair of cellulose acetate films.

It is noted that although FIG. 3 shows a single opening 6 formed along folding line 5, it is also within the scope of the invention to provide a plurality of such openings.

Figure 5:
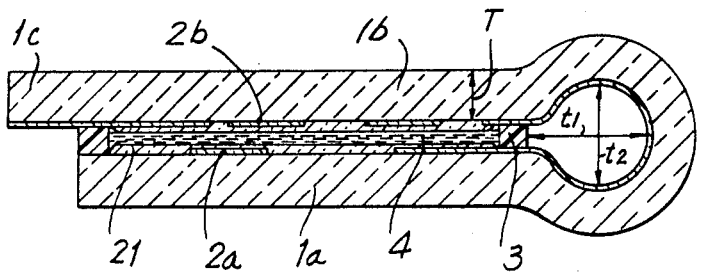
FIG. 5 is a cross-sectional view of a liquid crystal display device made according to one embodiment of the invention.

The following examples are illustrative of some preferred embodiments and ways of folding of the substrate:

A liquid crystal display device as shown in FIG. 5 was formed. It includes a substrate sheet 1 having a thickness expressed as T. The folded portion of substrate sheet has two different inside diameters $t_1$ and $t_2$ which are substantially equal to or larger than T. An orientation layer 21 is formed on at least the substrate surface contacting liquid crystal material 4. All the terminal electrodes 10 are formed on signal electrode portion 1b. Common electrodes 2a on the common electrode portion 1a extends to the substrate portion 1b on which the signal electrodes 2b are formed.

In addition, in the above mentioned examples, spacers are scattered on at least display areas on one side of the opposing substrate portions prior to bending the substrate.

EXAMPLE B-1

Figure 6A:
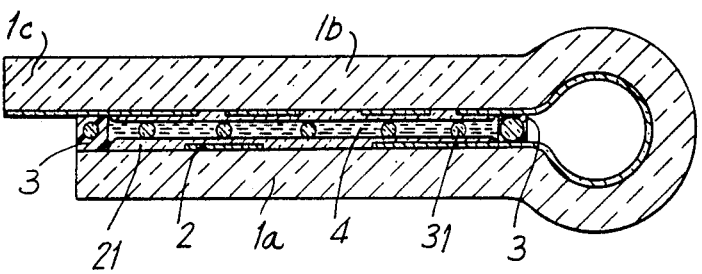
FIGS. 6(a), 6(b) and 6(c) are cross-sectional views of liquid crystal display devices made according to another embodiment of the invention.

A liquid crystal display device was formed as shown in FIG. 6(a). The device has a plurality of spacers 31 disposed within the space defined by sealing agent 3.

Each spacer 31 is a plastic ball. A liquid crystal layer 4 is injected into the space.

EXAMPLE B-2

A liquid crystal display device was formed using the process disclosed in EXAMPLE B-2, except that spacers 31 were formed from plastic fibers.

EXAMPLE B-3

Figure 6B:
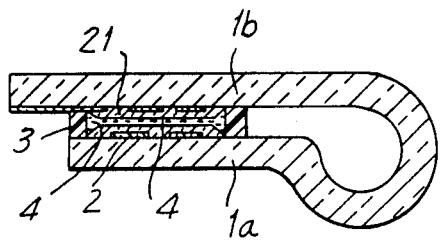

A liquid crystal display device was formed as shown in FIG. 6(b). The device has a folded portion projecting from the substrate portion which does not include the terminal portion.

EXAMPLE B-4

Figure 6C:
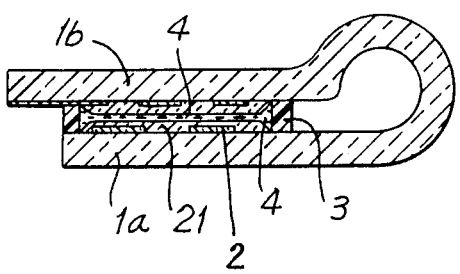

A liquid crystal display device was formed as shown in FIG. 6(c). The device has a folded portion projecting from the substrate portion which includes the terminal portion.

EXAMPLE B-5

Figure 7A:
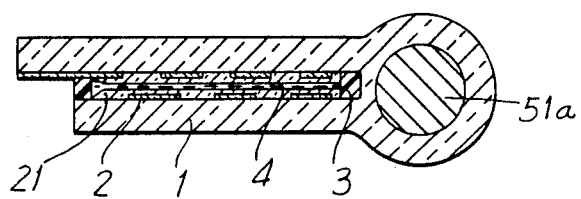
FIGS. 7(a), 7(b), 7(c) and 7(d) are cross-sectional views of liquid crystal display devices made according to a further embodiment of the invention.

A liquid crystal display device was formed as shown in FIG. 7(a). The device includes a substrate sheet 1 which was folded about a support structure 51a having a circular cross-section. Support structure 51a may be formed from the same synthetic resin as the substrate, a different synthetic resin or a metal such as iron, copper, aluminum or bakelite, glass or the like.

EXAMPLE B-6

Figure 7B:
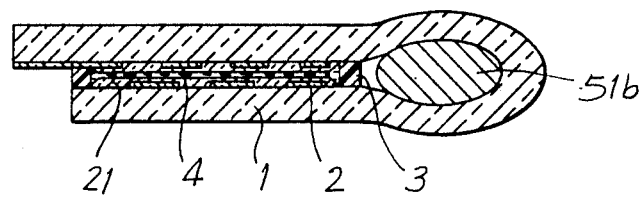

A liquid crystal display device was formed as shown in FIG. 7(b). The device utilizes a support structure 51b having an oval cross-section.

EXAMPLE B-7

Figure 7C:
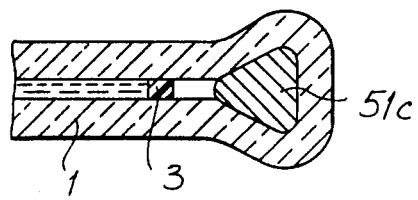

A liquid crystal display device was formed as shown in FIG. 7(c). Substrate sheet 1 was folded about a support structure 51c, said support structure having a substantially triangular crosssectional contour which varies along its radius.

EXAMPLE B-8

Figure 7D:
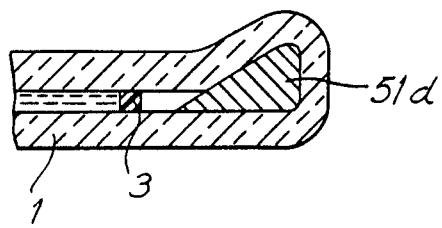

A liqud crystal display device was formed as shown in FIG. 7(d). Substrate sheet 1 was folded about a support structure 51d, having a cross-sectional contour defined by a combination of a straight line and a curved line.

EXAMPLE B-9

A liquid crystal display device was formed utilizing support structures in the manner disclosed in EXAMPLES B-5 through B-8. Substrate sheet was folded about a support structure so that its folded portion had an inside diameter larger than the overall thickness of substrate sheet 1. The support structure was then removed after substrate sheet 1 was folded.

EXAMPLE B-10

Figure 8A:
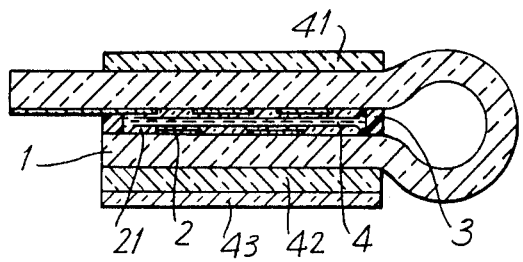
FIGS. 8(a), 8(b), 8(c) and 8(d) are cross-sectional views of liquid crystal display devices made according to still another embodiment of the invention.

A liquid crystal display device was formed as shown in FIG. 8(a). The device includes a liquid crystal cell as illustrated in FIG. 5 and an upper polarizer 41 and a lower polarizer 42 bonded to the top and the bottom of the display, respectively, by an adhesive. A reflector 43 is bonded to the lower polarizer 42.

EXAMPLE B-11

Figure 8B:
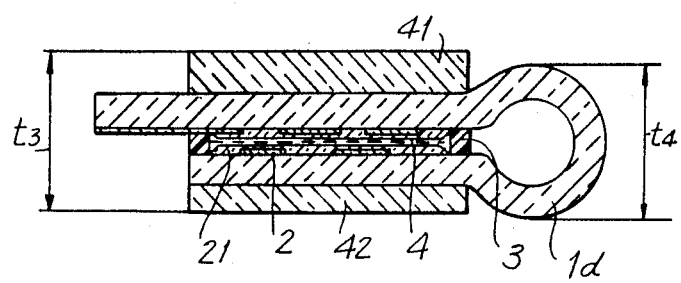

A liquid crystal display device was formed as shown in FIG. 8(b). The device includes a liquid crystal cell of the type illustrated in FIG. 5, upper polarizer 41 and lower polarizer 42 bonded to the top and bottom of the cell respectively. The upper surface of upper polarizer 41 and the lower surface of lower polarizer 42 lie in planes which do not cross the folded portion of the substrate. The thickness $t_3$ of the device between the upper surface of upper polarizer 41 and the lower surface of lower polarizer 42 is greater than the thickness $t_4$ of the folded portion.

EXAMPLE B-12

Figure 8C:
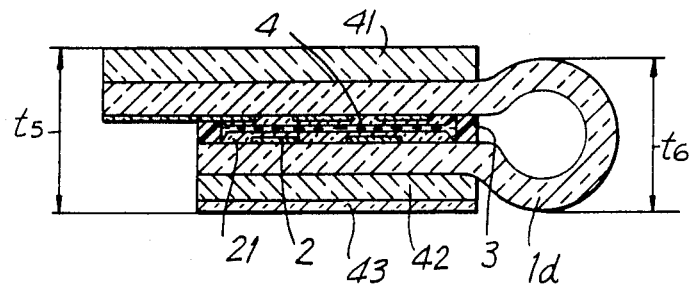

A liquid crystal display device was formed as shown in FIG. 8(c). The device includes upper polarizer 41 and lower polarizer 42 which are bonded to the top and bottom of the device respectively, and reflector 43 bonded to the bottom of lower polarizer 42. The upper surface of upper polarizer 41 and the lower surface of reflector 43 lie in planes not crossing the folded portion of the substrate. The thickness $t_5$ of the device between the upper surface of upper polarizer 41 and the lower surface of reflector 43 is greater than the thickness $t_6$ of the folded portion 1d.

EXAMPLE B-13

Figure 8D:
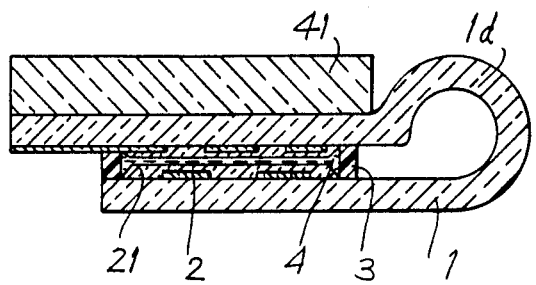

A liquid crystal display device was formed as shown in FIG. 8(d). The device includes a substrate sheet 1 which has a folded portion projecting 1d on one side of the liquid crystal cell with the front side of the cell on the opposite side. Polarizer 41 is bonded to substrate portion 1b adjacent to the projecting area of folded portion 1b. Polarizer 41 has an upper surface lying in a plane not crossing folded portion 1b. A second polarizer and reflector can be bonded to the opposite side of the cell from polarizer 41.

In a further embodiment of the invention, a plurality of liquid crystal display devices as shown in FIGS. 8(a) through 8(d) may be stacked one upon another to form a single display device.

Figure 9:
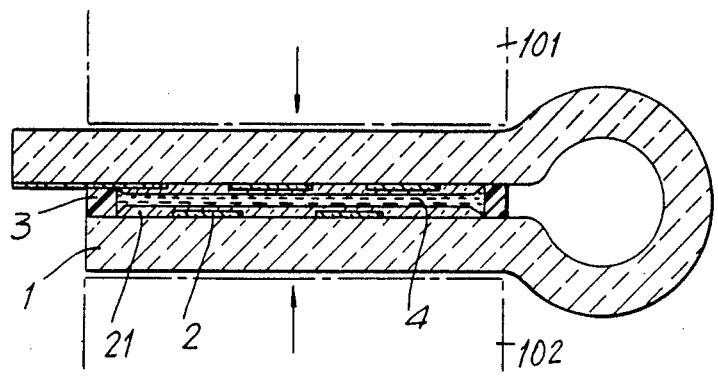
FIG. 9 is a cross-sectional view of a display panel showing a step in the manufacturing process according to the invention.

Referring now to FIG. 9, an apparatus for forming a liquid crystal display device of the type shown in FIGS. 1,5,6,7 and 8 where a substrate sheet 1 is folded so that the electrodes on the opposite sides of the liquid crystal layer 4 may be in mutual alignment is shown, substrate portions 1a and 1b are compressed by a pair of pressing members 101 and 102 compress into a predetermined thickness. Press members 101 and 102 may both be movable, or only one of them may be movable while the other one is stationary.

EXAMPLE B-14

Figure 26A:
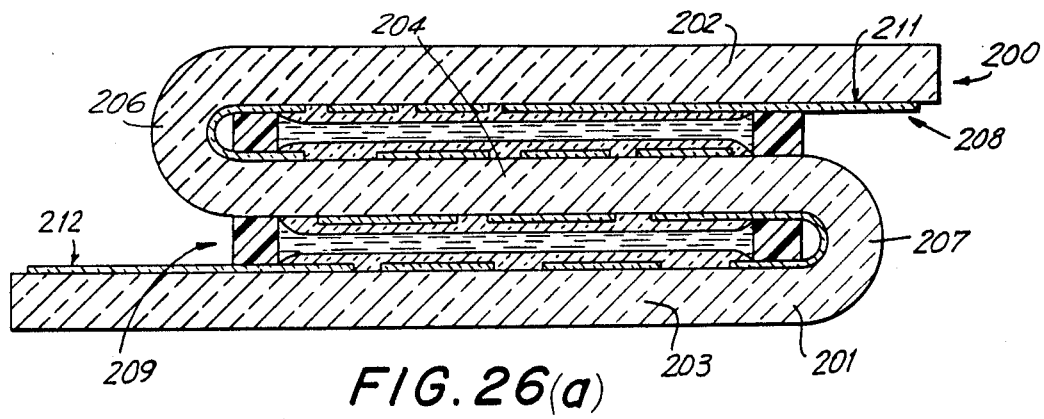
FIGS. 26(a), 26(b) and 26(c) are cross-sectional views of two-layer liquid crystal display devices according to another embodiment of the invention.
Figure 26B:
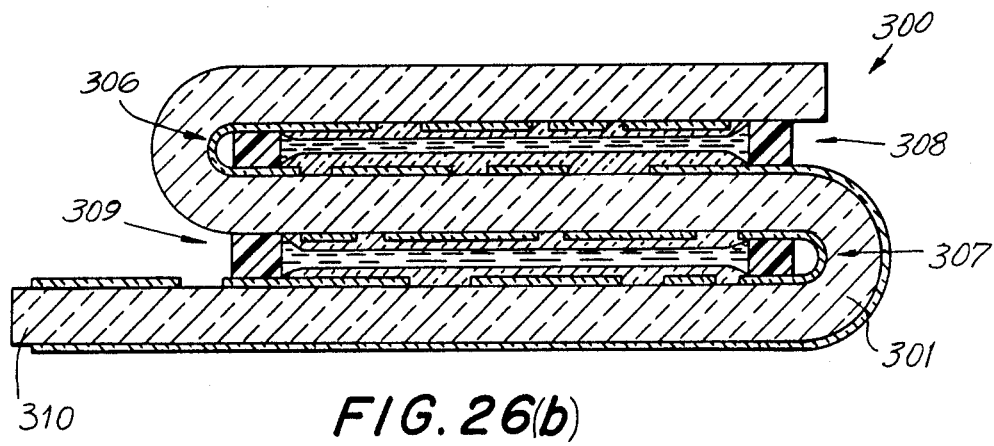
Figure 26C:
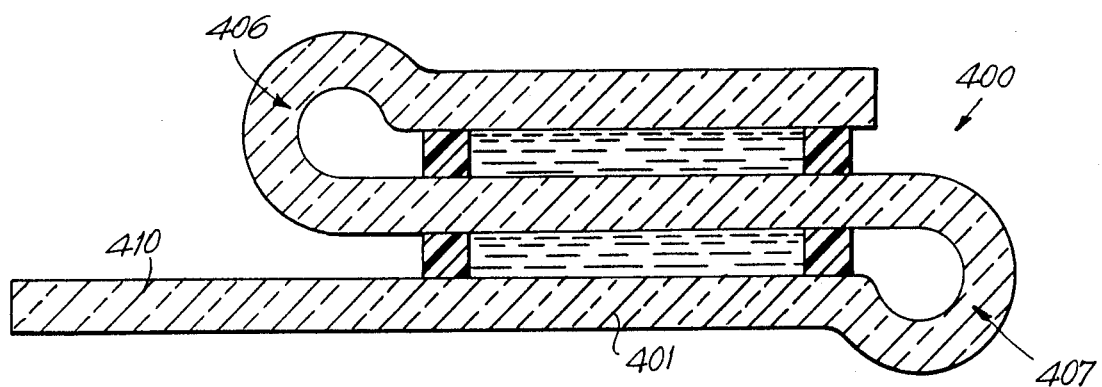

Two-layer liquid crystal display devices formed from a flexible substrate which is folded over itself twice in an "S" fashion are shown in FIGS. 26(a), 26(b) and 26(c). In FIG. 26(a), a two-cell device generally referred to as 200 is shown. Device 200 is formed from a single folded substrate sheet 201 having an upper planar portion 202, an opposed parallel lower portion 203 and an intermediate parallel planar portion 204. When substrate 201 is folded, an upper fold line 206 and a lower fold line 207 at opposed ends of intermediate portion 204 are formed.

Device 200 includes an upper liquid crystal display cell 208 and a lower liquid crystal display cell 209 formed between the cooperating planar portions of substrate 201. Each cell 208 and 209 includes a sealing material 3, which serves as a spacer, about the perimeter of the opposed portions of substrate 201 with liquid crystal material 4 disposed in the space between the planar portions. Each opposed surface of substrate 201 includes liquid crystal driving electrodes 2 with orientation films 21 disposed thereon.

In device 200, upper cell 208 includes an electrode terminal portion 211 formed on the interior surface of substrate portion 202 and extends beyond sealing material 3. Electrode 2 in cell 208 extends about fold line 206 to electrode terminal portion 211. Similarly, lower cell 209 includes a second electrode terminal portion 212 formed on the interior surface of lower substrate 203 with electrodes 2 from the upper surface in lower cell 209 extending about fold line 207. Electrodes 2 in both cells are disposed in the same manner as described in connection with the earlier embodiments.

FIG. 26(b) illustrates a two-cell liquid crystal display device shown generally as 300 formed from a single substrate 301. Device 300 is constructed in a similar manner as device 200. Substrate 301 is folded about an upper fold line 306 to form an upper display cell 308 and about lower fold line 307 to form a lower display cell 309.

Device 300 includes a single electrode terminal portion 310 formed on both the inner and outer surfaces of the lower substrate portion of substrate 301. Accordingly, electrodes 2 from both opposed surfaces in both cells extend to terminal portion 310 so that electrode 2 on the interior surface of the intermediate portion of substrate 301 extends about the outside of fold line 307 along the exposed surface of the lower substrate portion of substrate 301.

Referring now to FIG. 26(c), a two-cell liquid crystal display device 400 is shown. Device 400 is formed from a single substrate sheet 401 which is folded about an upper fold line 406 and a lwoer fold line 407. Device 400 include a single electrode terminal portion 410 as in device 300. Fold lines 406 and 407 have fold radii which are larger than the thickness of each display cell in device 400.

EXAMPLE B-15

Figure 27A:
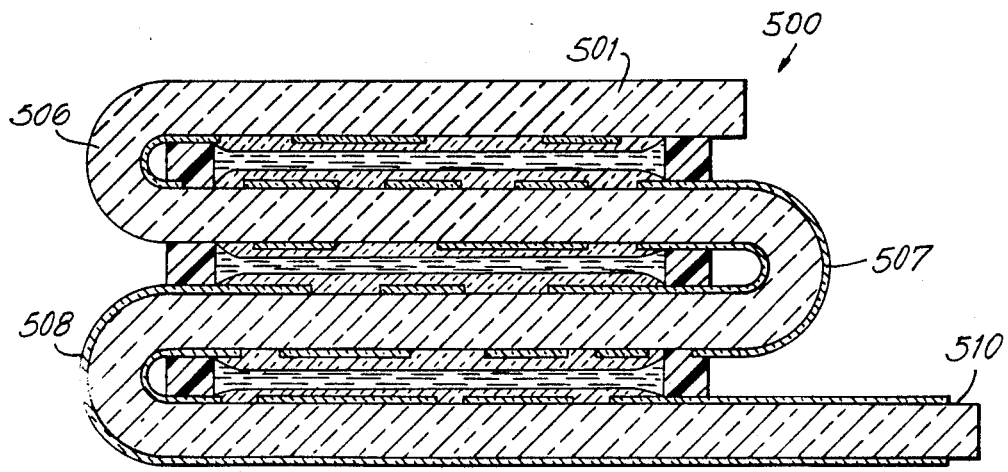
FIGS. 27(a) and 27(b) are cross-sectional views of threelayer liquid crystal display devices made according to a further embodiment of the invention.

A three-layer liquid crystal display device 500 formed from a single substrate sheet 501 is shown in FIG. 27(a). Device 500 is substantially similar to two-cell device 300 of FIG. 26(b). Substrate 500 is a "S" shaped device formed from a flexible substrate 501 folded about itself a first time about an upper fold line 506 and folded back on itself about a second fold line 507 and folded about itself along a third fold line 508. Device 500 also include a single electrode terminal portion 510 formed on the lower portion of substrate 501. In this embodiment of the invention, electrodes 2 from each cell extend about fold lines 506, 507 and 508 and extend to electrode terminal portion 510.

Figure 27B:
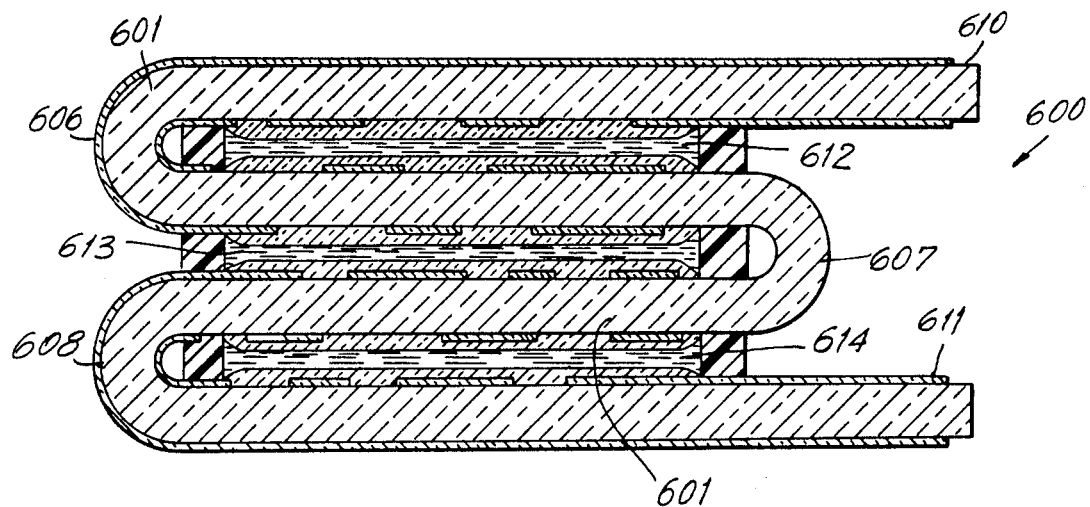

In FIG. 27(b), a three-layer device 600 formed from a single flexible substrate 601 and having two electrode portions 610 and 611 is shown. Substrate 601 is folded about itself three times at an upper fold line 606, and intermediate fold line 607 and a lower fold line 608 for forming an upper cell 612, and intermediate cell 613 and a lower cell 614.

In this construction, electrodes 2 on both opposed surfaces of upper cell 612 extend to the inner surface of the upper portion of substrate 601 and electrode 2 on the upper surface of intermediate cell 613 extends about the outside of fold line 606 to the upper surface of electrode portion 610. Similarly, both electrode portions 2 on the opposed surfaces of lower cell 614 extend to the inner surface of electrode portion 611. Electrode 2 on the lower surface of intermediate cell 613 extend about the outside of lower fold line 608 to the outer surface of second electrode terminal portion 611.

It is noted that the construction of multi-layered liquid crystal display devices in accordance with the invention is not limited to the configurations depicted in FIGS. 26 and 27. Rather, the continuous back and forth folding of the flexible substrates defines a multiplicity of spaces which can be sealed and filled with liquid crystal material to form a number of multi-layered display devices.

EXAMPLE C-1

Figures 10A, 10B:
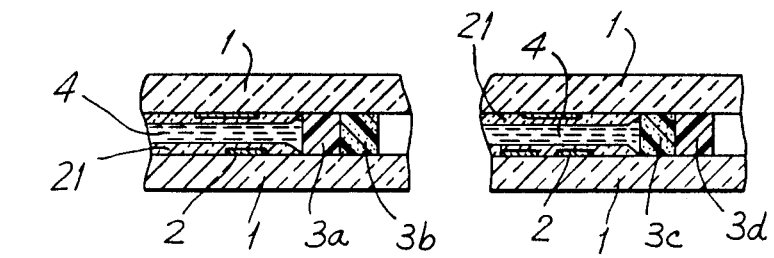
FIGS. 10(a) and 10(b) are partial cross-sectional views of a liquid crystal display device made according to another embodiment of the invention.

A liquid crystal display device as shown in FIG. 10(a) was formed. The device is sealed by sealing portion 3 composed of an inner seal 3a and outer seal 3b. Inner seal 3a contacting liquid crystal layer 4 is of low reactivity with liquid crystal and outer seal 3b is of a type which is low in water permeability. In this embodiment inner seal 3a is a silicone resin and outer seal 3b is an epoxy resin.

EXAMPLE C-2

A liquid crystal device as shown in FIG. 10(b) was formed. The device is sealed by sealing portion 3 which is composed of an inner seal 3c and an outer seal 3d. Inner seal 3c contacting the liquid crystal layer 4 is of the type low in water or moisture permeability and outer seal 3d is flexible. In this example inner seal 3c is an epoxy resin and outer seal 3d is a silicone resin.

EXAMPLE D

Figure 11A:
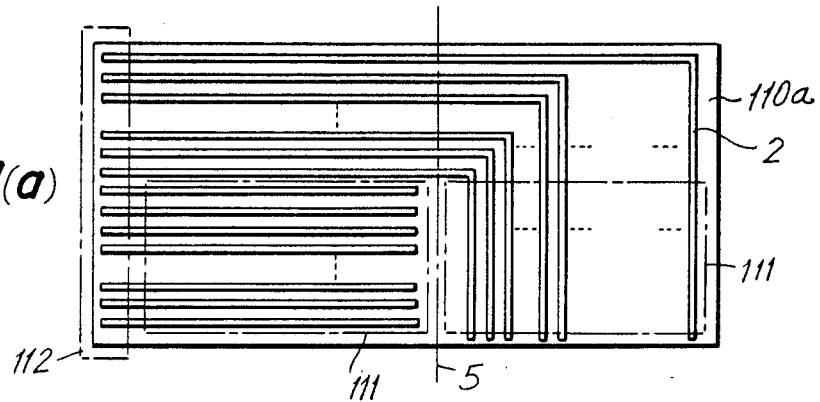
FIGS. 11(a)–11(h) each is a plan view of a substrate sheet in an unfolded condition for a liquid crystal display device according to an embodiment of the invention.
Figure 11B:
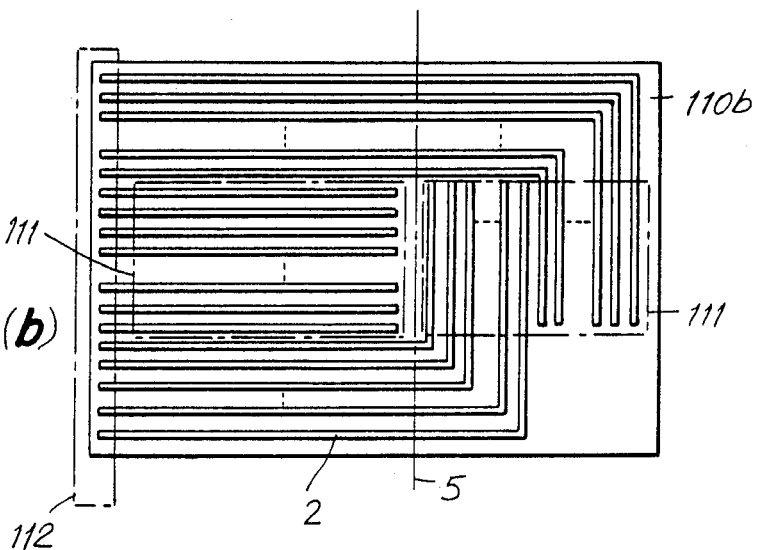
Figure 11C:
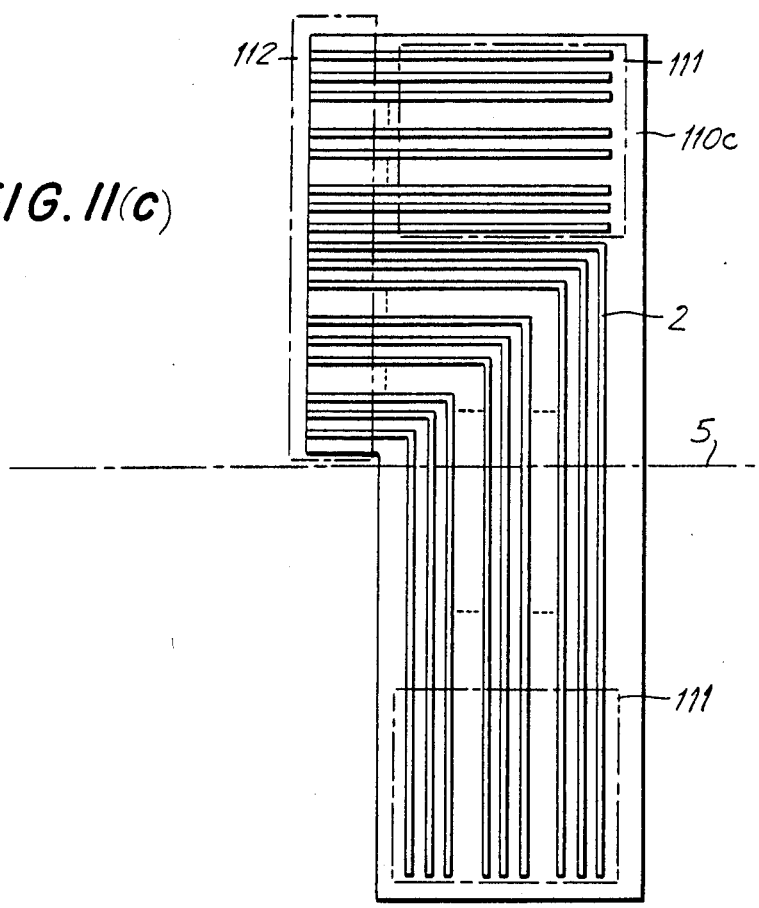

A substrate sheet 110 for a liqud crystal display device is shown in FIGS. 11(a), 11(b) and 11(c). The device will have a display area 111 which is formed from at least a portion of a matrix-type display for conducting a literal, numerical, graphical or pictorial display. Substrate sheet 110 is folded along folding line 5 to enable the oppositely disposed electrode patterns 2 disposed at right angles on sheet 110 to form the matrix array upon folding. Display area 111 is sealed along its periphery and filled with a liquid crystal. Terminals 112 are provided at one edge of the substrate sheet 110.

Figure 11D:
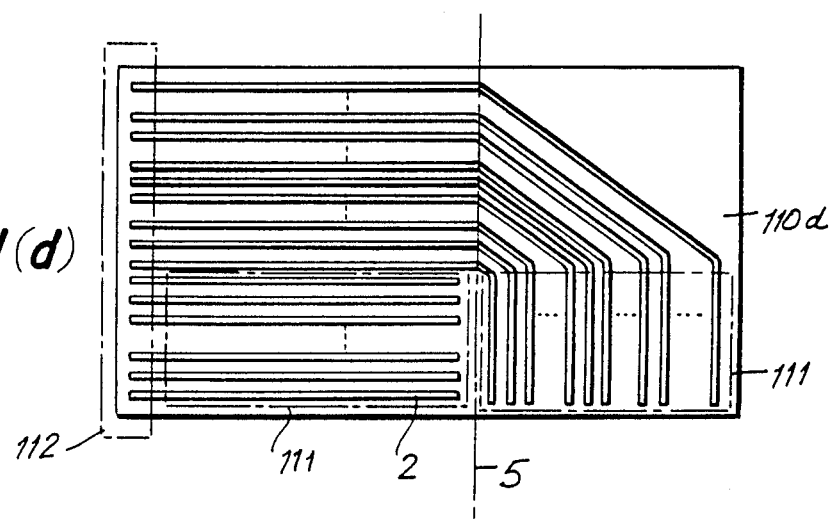
Figure 11E:
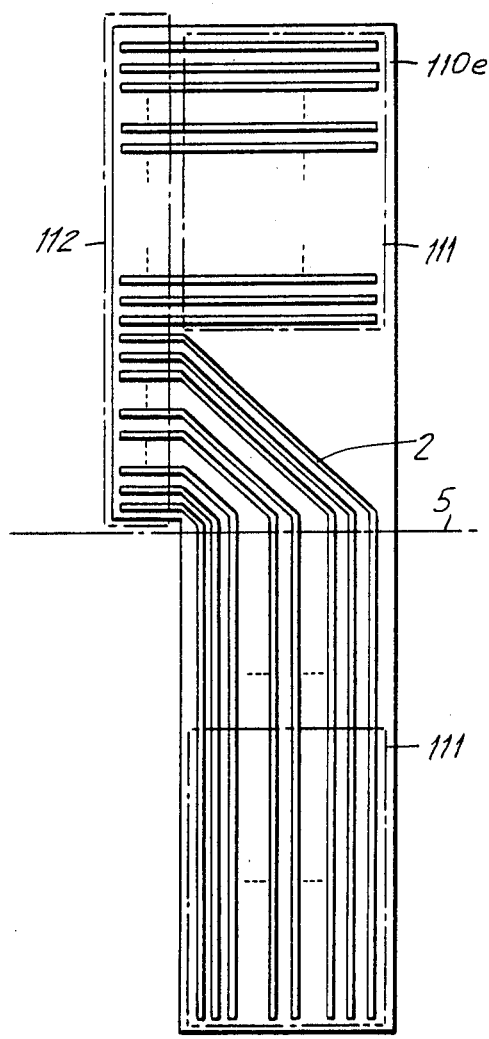

In FIGS. 11(d) and 11(e) substrate sheets 110d and 110e are shown. The device has a display area 111 which is at least partly of the matrix type for providing a display. Sheets 110d and 110e include electrode patterns 2 which include slanting portions which shorten the distance between electrode wiring 2 between terminal 112 and display area 111 to reduce the resistance of said wiring.

Figure 11H:
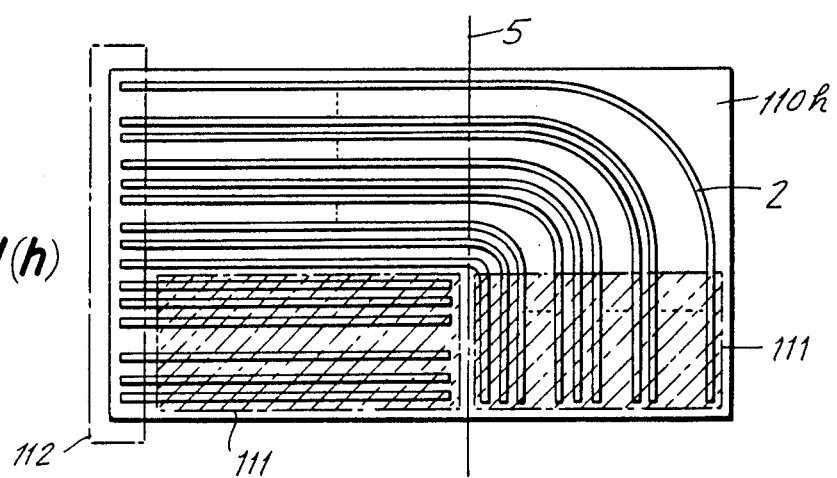
Figure 11F:
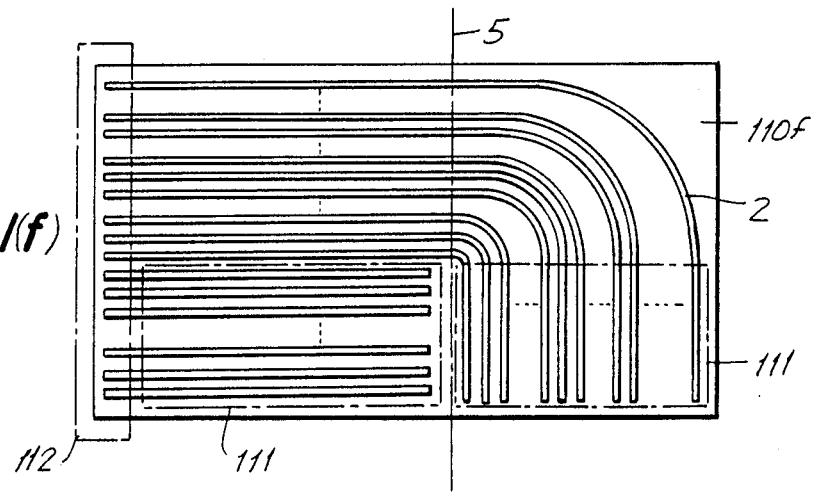

A substrate sheet for a liquid crystal display device in accordance with another embodiment is shown in FIG. 11(f). A part of electrode wiring 2 on substrate sheet 110g has a curved pattern which is substantially circular or oval. This wiring pattern creates an increase in the width of the electrode wires and their spacing in the curved portion to thereby reduce the tension on the wiring.

Figure 11G:
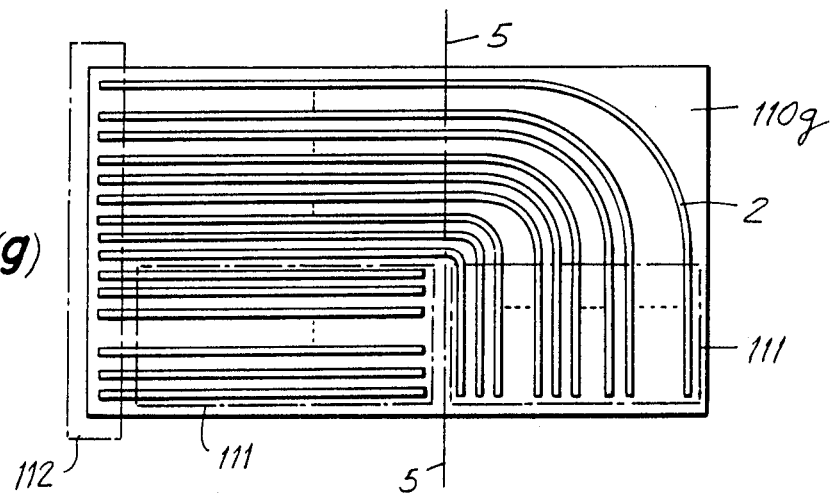
Figure 12A:
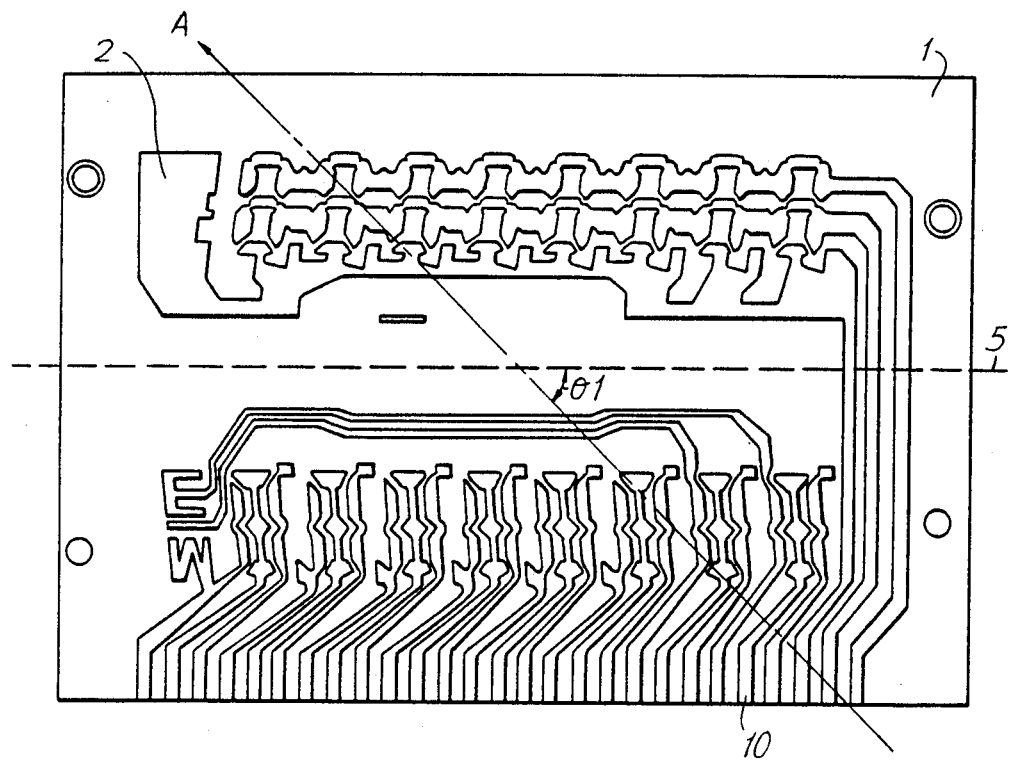
Figure 12B:
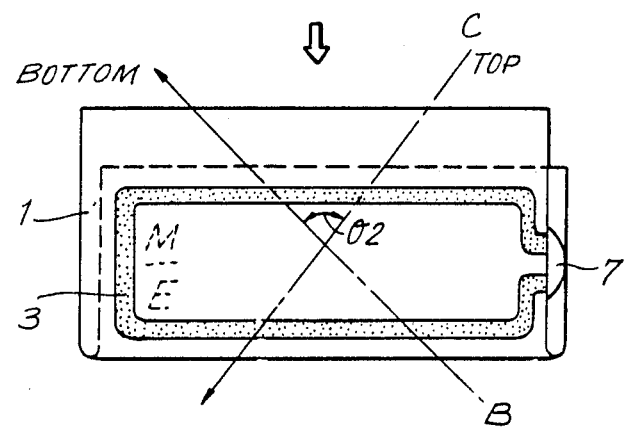

In the substrate sheet 110 shown in FIG. 11(g) electrode wire pattern extending from terminal portion 112 and across folding line 5 has greater thickness in the area having long wires than in an area having short wires. This arrangement insures a substantially equal strain on the wiring, irrespective of the length of the wires extending from terminal 112 to display area 111.

In substrate sheet 110 shown in FIG. 11(h) display area 111 is plated with electroless nickel in the regions not covered by electrode pattern 2. This reduces the resistance of the electrode wiring between terminals 112 and display area 111. Furthermore, it is also possible to plate the display area 111 with an electrically conductive material, such as nickel, copper, aluminum, or the like. The display area plating may be in monolayer or multilayer plating.

Figure 23A:
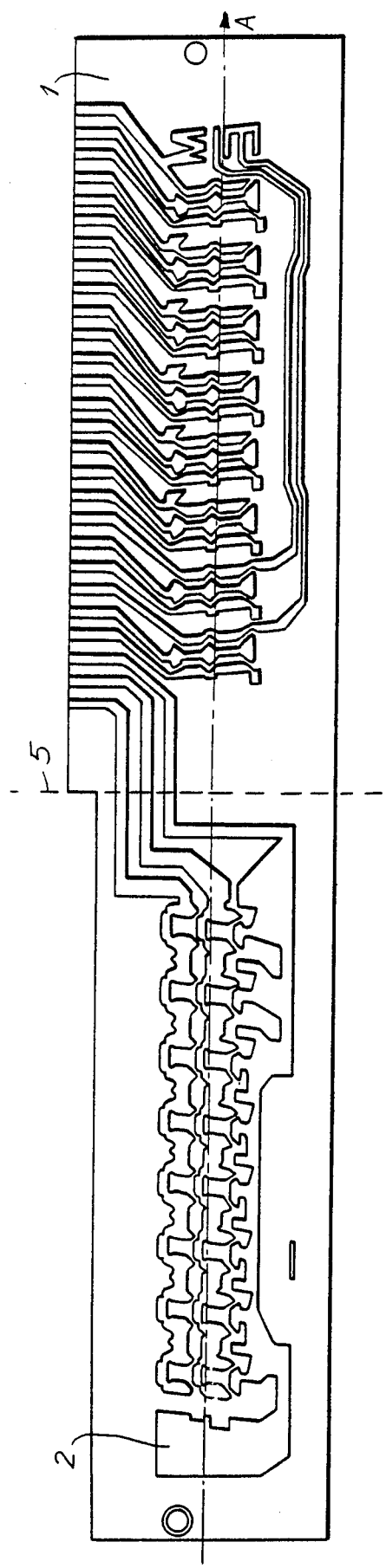
Figure 23B:
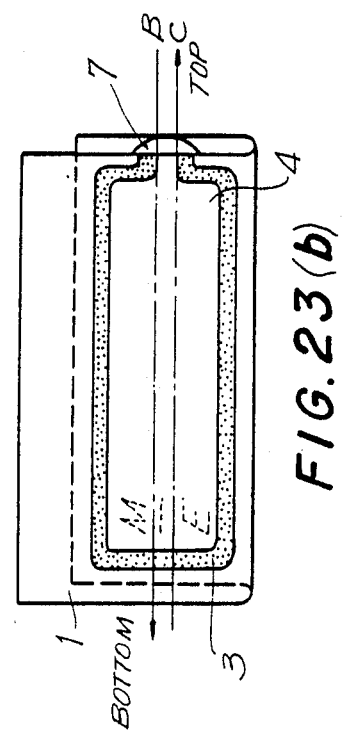
Figure 24A:
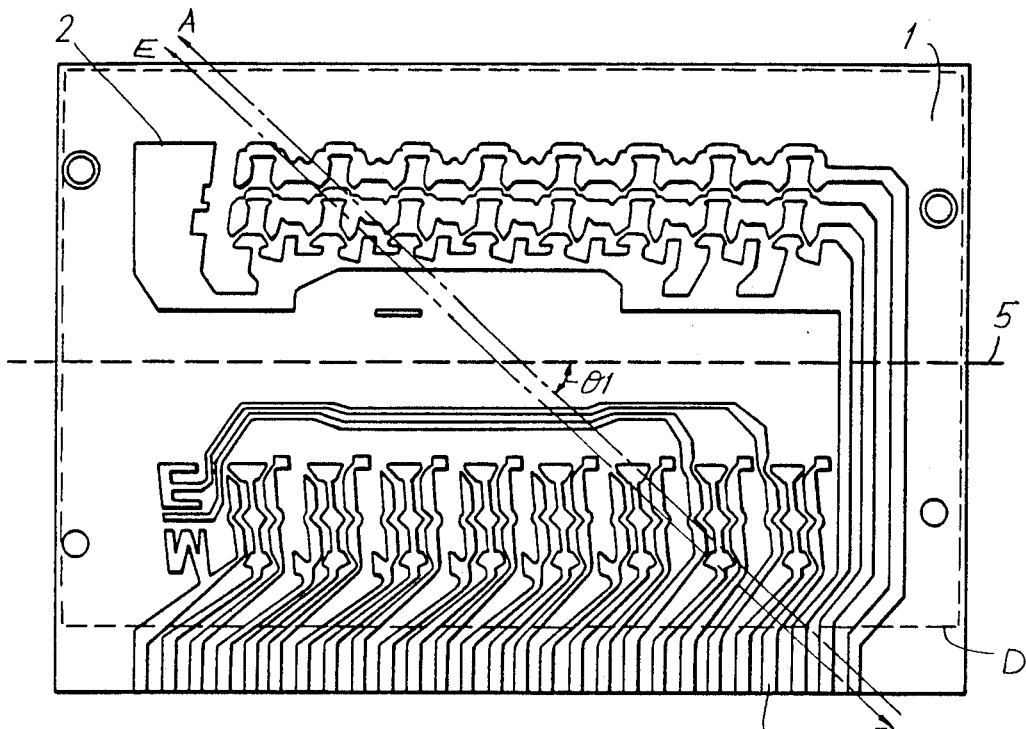
Figure 24B:
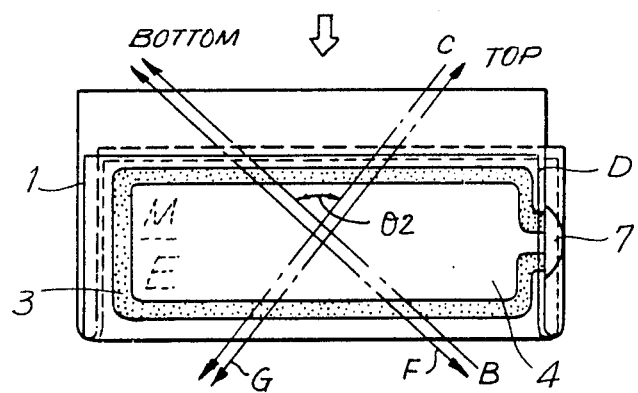
Figure 25A:
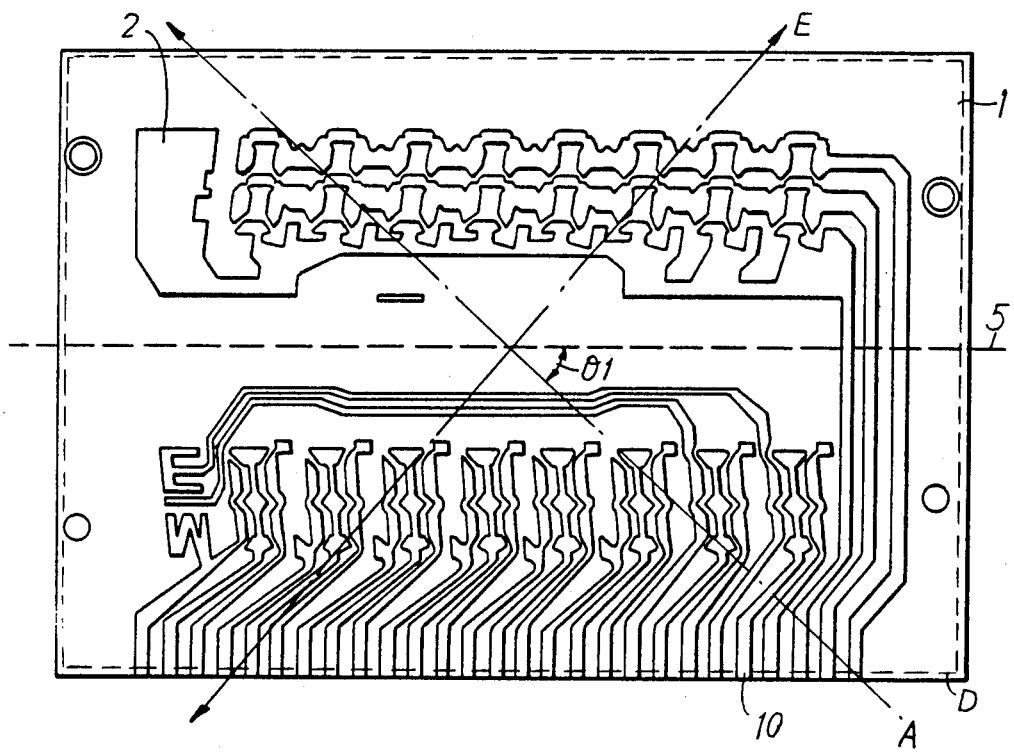
Figure 25B:
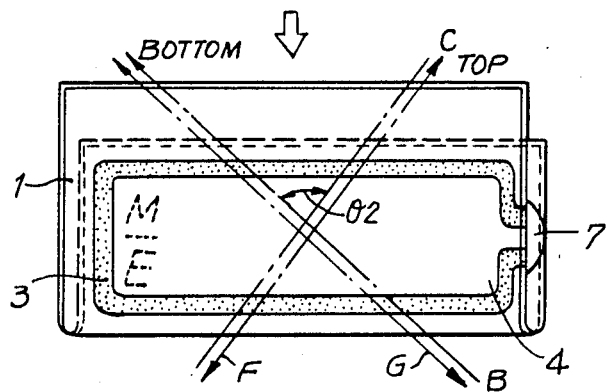

FIGS. 12(a) to 17(a), 24(a) and 25(a) show substrate sheets 1 with electrode patterns 2 as illustrated in FIG. 1 and 24(b) and 25(b), respectively, and FIGS. 12(b) to 17(b) show the liquid crystal display devices obtained by folding substrate sheet 1 along folding line 5. FIGS. 18(a) to 23(a) shows substrate sheets 11 of the type illustrated in FIG. 4 which are folded along folding line 15 to form the display devices of FIGS. 18(b) to 23(b), respectively.

EXAMPLE E-1

Substrates 1 and 11 are treated of orientation by rubbing or by evaporation in a direction A at an angle $\theta 1$ to folding line 5 or 15, as shown in each corresponding (a) figure. In the assembled device the lower portion of substrate sheet 1 has a direction of orientation shown as B, while the upper portion of substrate sheet 2 has a direction of orientation shown as C. Accordingly, each liquid crystal display device has an angle of orientation $\theta 2$ defined by the intersection of lines B and C as shown, for example, in FIG. 12(b). Directions B and C of orientation define the direction of clear vision which is from the top to the bottom in FIG. 12(b) and is shown by an arrow. In general, the angle $\theta 1$ is about 45°, however, it may be in a range of about 40° to 50°, and the angle $\theta 2$ is also about 90°, but may be within the range from about 100° to 80°.

Substrates sheet 1 and 11 are treated for orientation only in a single direction A in the unfolded position. The device obtained by folding substrate sheet 1 has a predetermined angle of liquid crystal orientation $\theta 2$ and a predetermined direction of clear vision which depends upon angle $\theta 1$ between orientation direction A and folding line 5 and orientation directions B and C of the lower and upper substrate portions respectively.

The orientation in directions A,B and C are obtained by rubbing in those directions, or alternatively, by evaporation of, for example, SiO or SiO$_2$ in a slanting pattern.

EXAMPLE E-2

Figure 13A:
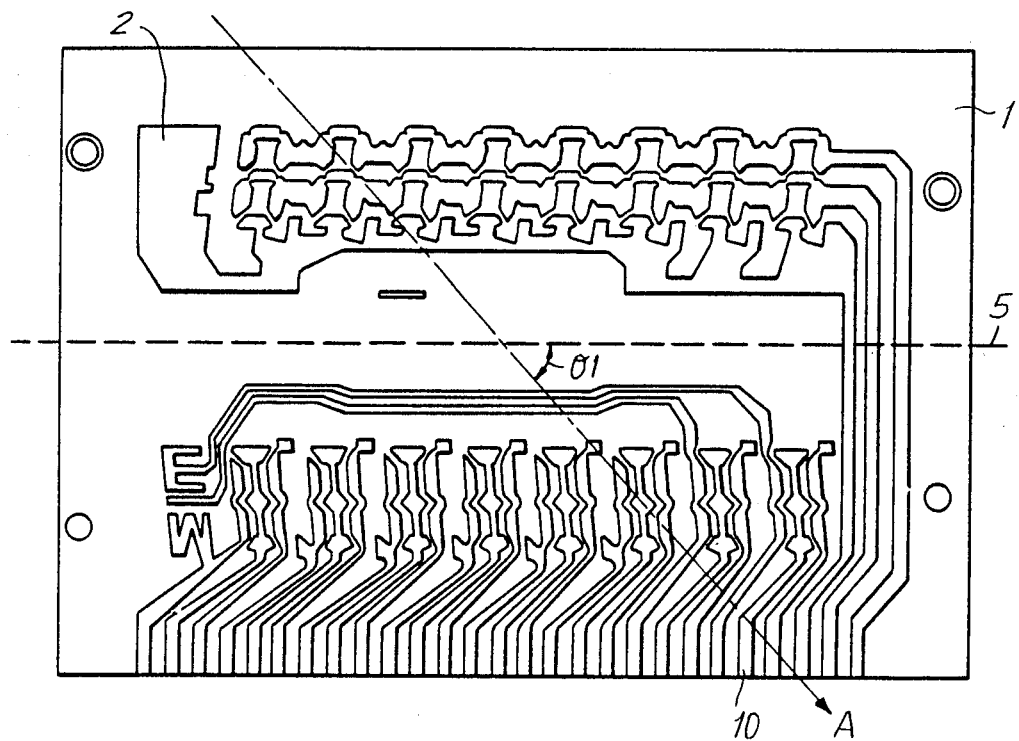
Figure 13B:
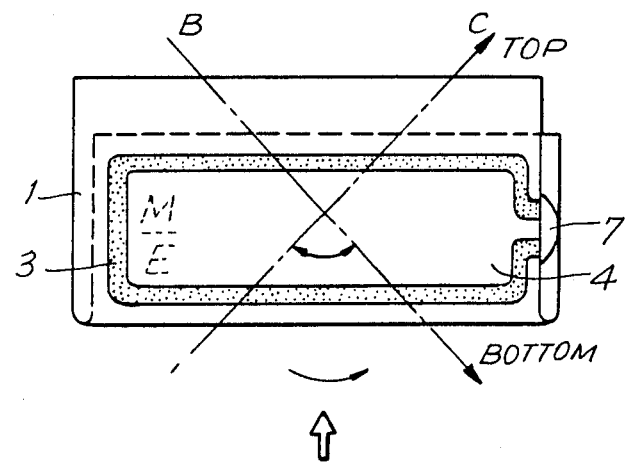

The liquid crystal display device in FIG. 13(b) has a direction of vision extending from the bottom to the top. Substrate sheet 1 was treated for orientation in direction A at an angle $\theta 1$ to folding line 5 and having an electrode pattern thereon and folded along line 5.

EXAMPLE E-3

Figure 14A:
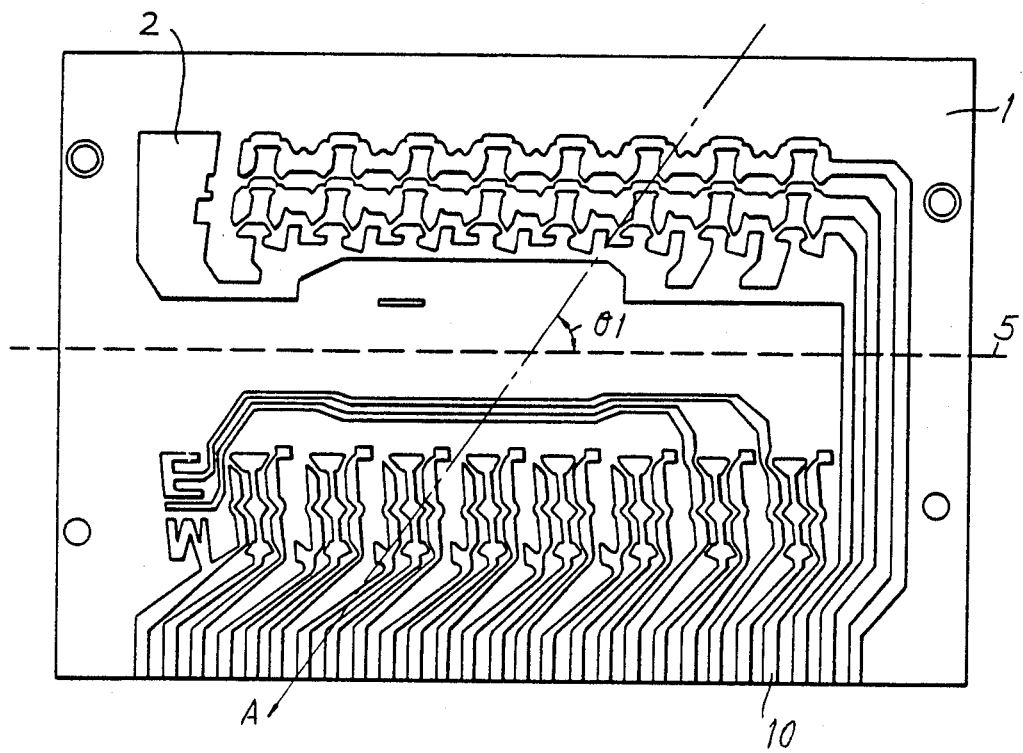
Figure 14B:
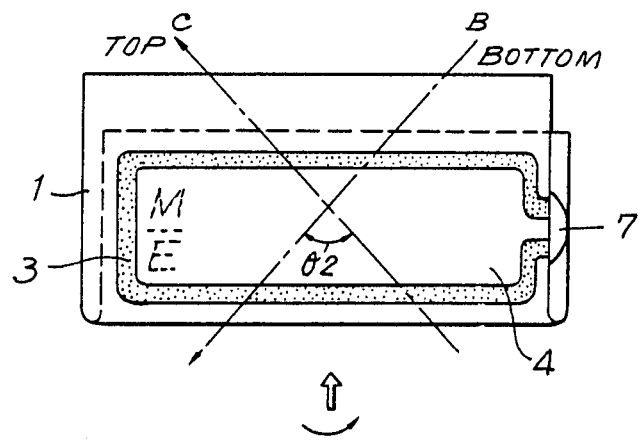

The liquid crystal display in FIG. 14(b) has a direction of vision extending from the bottom to the top. Substrate sheet 1 was treated for orientation in direction A and folded along folding line 5. The device of FIG. 14(b) has a direction of liquid crystal orientation which is the opposite to that shown in FIG. 13(b).

EXAMPLE E-4

Figure 15A:
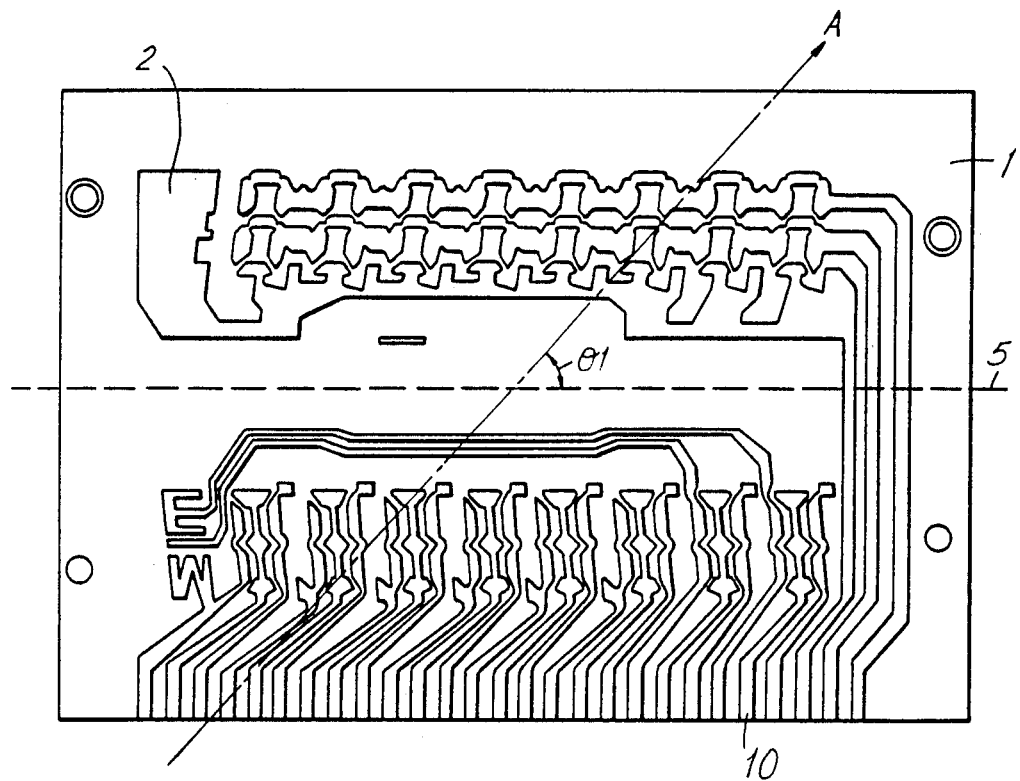
Figure 15B:
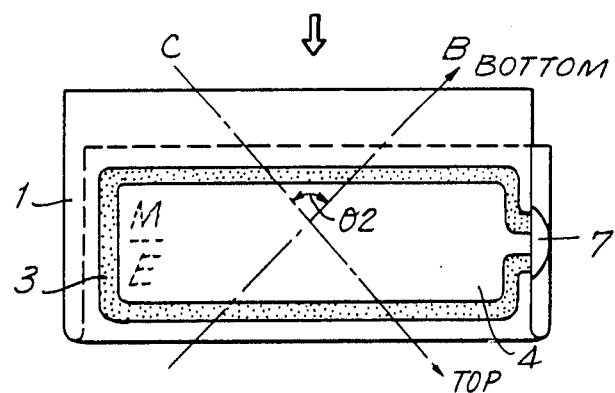

FIG. 15(b) shows a liquid crystal display device assembled after treatment for orientation in direction A as shown in FIG. 15(a). It has a direction of clear vision from the top to the bottom and has a direction of liquid crystal orientation $\theta 2$ opposite to that of the device shown in FIG. 12(b).

EXAMPLE E-5

Figure 16A:
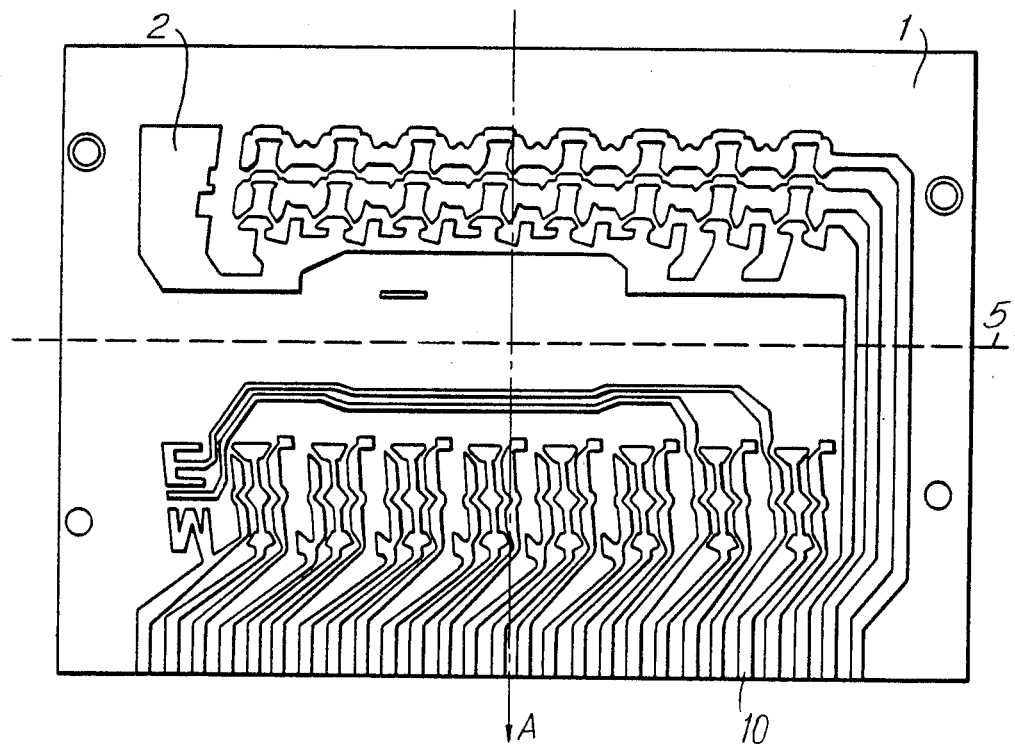
Figure 16B:
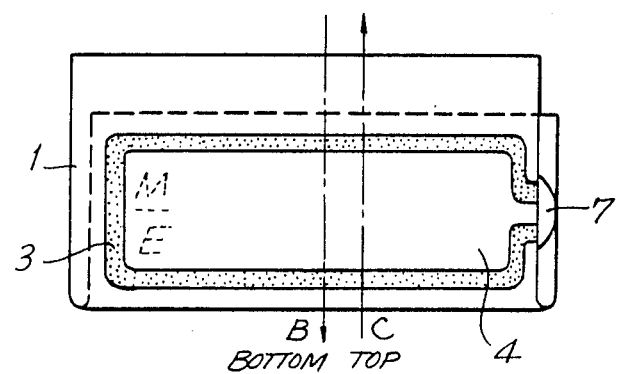

Substrate sheet 1 for forming the liquid crystal display device of FIG. 16(b) was treated for orientation along line A substantially at right angles to folding line 5 as shown in FIG. 16(a). The device obtained by folding line 5 has an orientation angle of 180°, as shown in FIG. 16(b).

EXAMPLE E-6

Figure 17A:
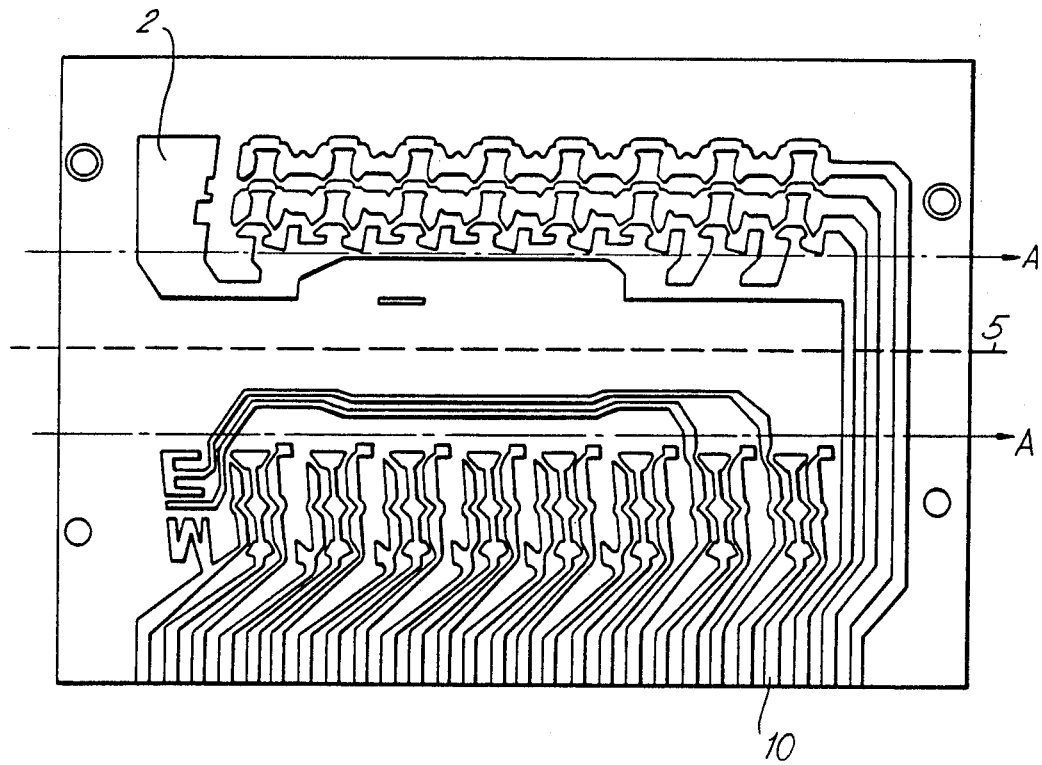
Figure 17B:
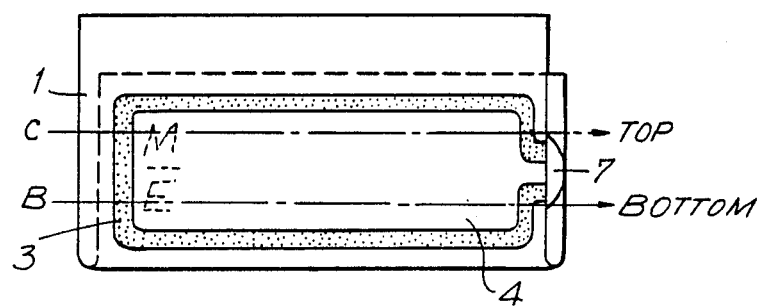

FIG. 17(a) shows substrate sheet 1 which is treated along lines A and which are parallel to folding line 5. Thus, both upper and lower portions are treated in parallel. The device obtained by folding the substrate along line 5 has an orientation angle of 0°.

The trem "orientation of angle °" includes any angle of $\alpha°$ plus $360° \times N$ where N is equal to an integer. In this specification any such angle is expressed simply as $\alpha°$. Accordingly, the orientation angle of 90° includes, for example, 450° and 810°. Likewise, the orientation angle of 0° includes 360° and 720°.

The devices of FIGS. 12(b) to FIGS. 17(b) are obtained by folding substrate sheets 1 along folding line 5 extending longitudinally between the electrode patterns formed on substrate sheet 1 as described above. On the other hand, FIGS. 18(a) and (b) to FIGS. 23(a) and (b) show a device obtained by folding substrate sheets 11 along folding line 15 extending transversely to the signal and common electrode patterns as will now be described in more detail.

EXAMPLE E-7

Substrate 11 in FIG. 18(a) was treated for orientation in direction A. The device obtained by folding substrate sheet 11 along folding line 15 has a direction of clear vision extending from the left to the right, as shown in FIG. 18(b).

EXAMPLE E-8

Substrate sheet 11 in FIG. 19(a) was treated for orientation in direction A. The device obtained by folding has a direction of clear vision extending from the right to the left as shown in FIG. 19(b).

EXAMPLE E-9

Figure 20A:
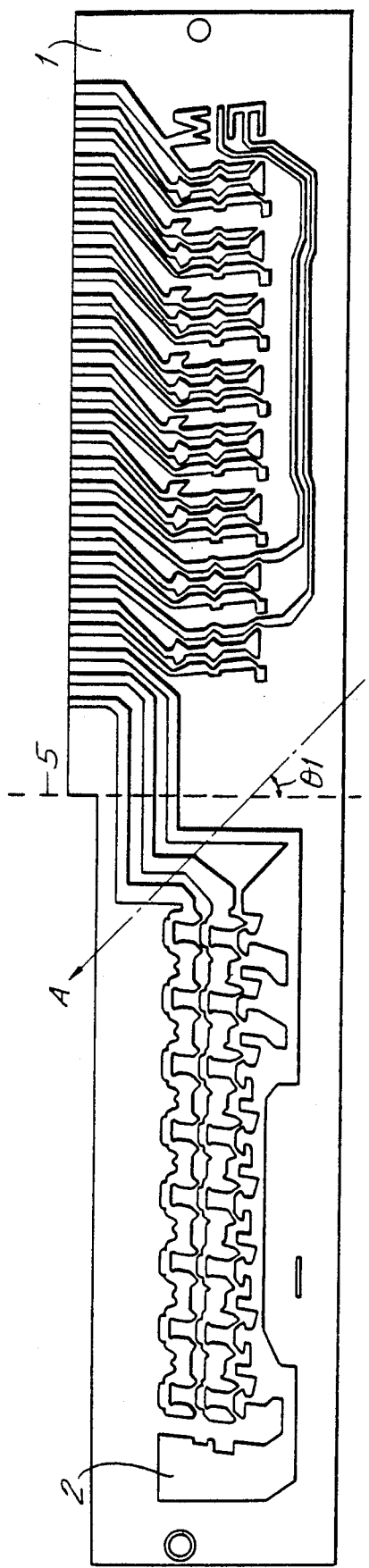
Figure 20B:
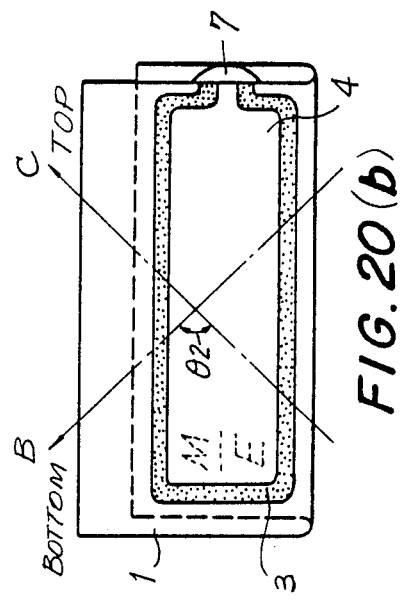

Substrate sheet 11 in FIG. 20(a) was treated for orientation in direction A which is orthogonal to that shown in FIG. 18(a). The device of FIG. 20(b) after folding also has a direction of vision extending from the left to the right, but has a direction of liquid crystal orientation which is opposite to that of the device shown in FIG. 18(b).

EXAMPLE E-10

Figure 21A:
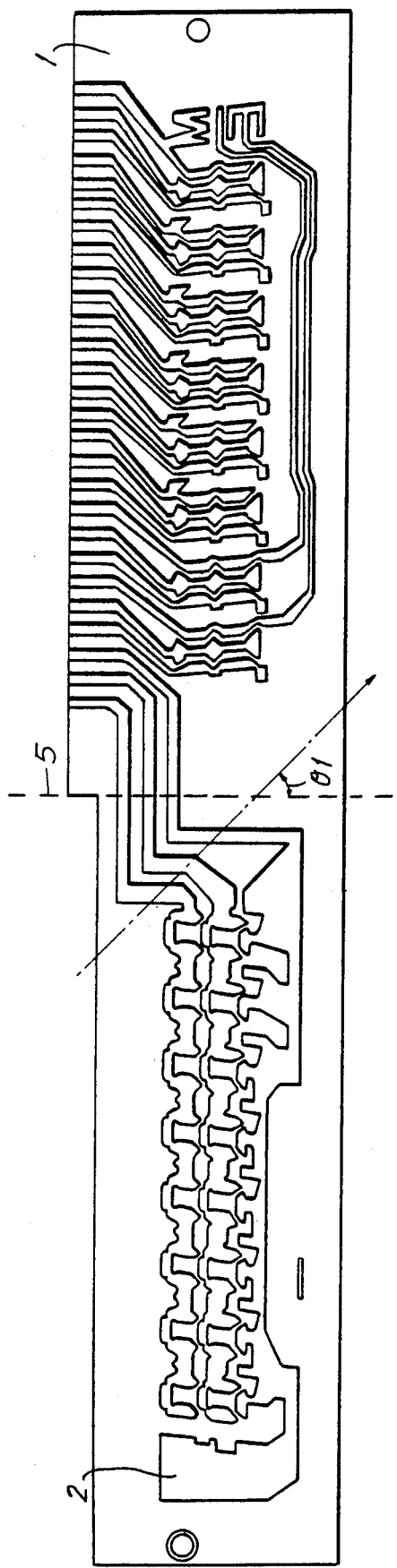
Figure 21B:
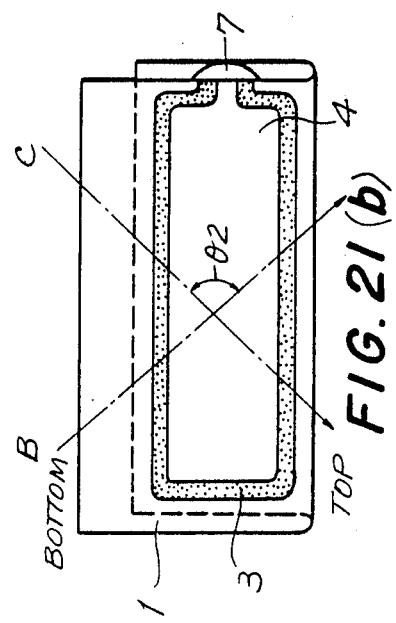

Substrate sheet 11 in FIG. 21(a) was treated for orientation in direction A. The device of FIG. 21(b) after folding has a direction of clear vision extending from right to left, but has a direction of liquid crystal orientation which is opposite to that of the device shown in FIG. 19(b).

EXAMPLE E-11

Substrate sheet 11 of FIG. 22(a) was treated for orientation in direction A which is in parallel to folding line 5. The device after folding as shown in FIG. 22(b) has a liquid crystal orientation angle 0° (or for example, 360° or 720°). If the direction of orientation treatment is at right angle to folding line 5 as shown in FIG. 23(a), the liquid crystal cell has an orientation angle of 180° (or for example, 540° or 900°) as shown in FIG. 23(b).

It is of course possible to turn direction A by 180° or provide orientation treatment which is parallel to folding line 5 as shown in FIGS. 17(a) and 22(a), or which has a right angle to foldling line 5 as shown in FIGS. 16(a) and 23(a).

Reference is now made to a twisted nematic type liquid crystal panel having a polarizer on each side of a liquid crystal layer as shown in FIGS. 24(b) and 25(b). For the sake of simplicity, description will be made of a device in which a polarizer D is incorporated into the device described above with reference to FIGS. 12(a) and 12(b). Polarizer D has an absorption axis E which extends in parallel to direction of orientation treatment A as shown in FIG. 24(a), or which has a right angle thereto as shown in FIG. 25(a).

In the device obtained by folding substrate sheet 1 of FIG. 24(a), direction of orientation C of the upper portion of liquid crystal layer 4 and absorption axis G of polarizer D on the upper side of the liquid crystal cell are in parallel to each other. Both are at substantially right angles or between 80° and 100° to direction of orientation B of the lower portion of liquid crystal layer 4 and absorption axis F of polarizer D on the lower side of the liquid crystal cell which are in parallel to each other. Thus, the liquid crystal material is orientated in a twisted pattern, and the changes caused in the orientation of liquid crystal material 4 upon the application of a voltage thereacross provides a display by alternating the transmission and shielding of the incident light subjected to linear polarization by polarizers D in the usual manner.

In the device obtained by folding substrate sheet 1 shown in FIG. 25(a), direction of orientation C of the upper portion of liquid crystal layer 4 is at a right angle to absorption axis G of polarizer D on the upper side of the liquid crystal cell, and direction of orientation B of the lower portion of liquid crystal layer 4 is at a right angle to absorption axis F of polarizer D on the lower side of the liquid crystal cell as shown in FIG. 25(b). Thus, the changes caused in the orientation of liquid crystal material 4 upon application of voltage thereacross provides a display by alternating the transmission and shielding of incident light subjected to linear polarization by polarizers D in the usual manner.

A variety of EXAMPLES hereinabove have been described and include the liquid crystal display panel utilize normal light, and also those which utilize polarized light.

It will thus be obvious that the arrangements of FIGS. 24(a) and 24(b) or 25(a) and 25(b) are applicable to the devices of FIGS. 13(a) and 13(b), 14(a) and 14(b), 15(a) and 15(b), 16(a) and 16(b), 17(a) and 17(b), 18(a) and 18(b), 19(a) and 19(b), 20(a) and 20(b) or 21(a) and 21(b) to produce a field effect type liquid crystal display device.

It will also be noted that the polarizer D itself may form the substrate sheet. It is also possible to use a substrate sheet having polarizing properties. Moreover, the substrate sheet and polarizers can be formed into a unitary body. If the substrate has polarizing properties, or forms a unitary body with polarizers to provide polarizing properties, the substrate may be treated for orientation at an angle to the absorption axis of the polarizer, and then folded to form the liquid crystal display device. If the substrate and the polarizers are separated from each other, the polarizers are joined with the substrate so that the absorption axis E thereof may have a predetermined angle, and the substrate is treated for orientation at a predetermined angle to the absorption axis E of the polarizers.

The liquid crystal panel of this invention constructed as hereabove described has a number of advantages over the conventional device. It is inexpensive, since it does not require any conductor of the type hitherto required in view of the hardness of the glass substrates in the conventional device, and therefore, does not require any printing and drying work for the conductor. The elimination of any such conductor also makes the device of this invention highly reliable, since the conductor, which has been composed of an adhesive containing silver powder or the like, is low in resistance to changes in environmental conditions, such as temperature and humidity, and a resistance to a mechanical impact and is likely to cause the loss of electrical continuity.

It will thus be seen that the objects set forth above, and those apparent from the preceding description are effectively attained and since certain changes may be made in the above construction and process without departing from the spirit and scope of the invention it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A liquid crystal display device comprising a folded substrate sheet having an upper planar portion and an opposed lower planar portion spaced apart and parallel to each other and a fold line between the planar portions, a sealing material disposed about the perimeter of the opposed portions of the substate sheet for defining a space, liquid crystal material sealed in the space, each facing portion of the substrate sheet having cooperating electrode patterns formed thereon for applying a voltage therebetween across the liquid crystal material to render selected portions visually distinguishable from the remaining material, one of said electrode patterns on one of the opposed substrate portions extending about the fold line between the substrate portions to the edge of the other substrate portion.

2. The liquid crystal display device of claim 1, wherein one of the opposed portions of the substrate sheet extends further from the fold line than the other of said portion of the substrate sheet to define a terminal region, the electrodes on both opposed portions extending to the terminal region.

3. The liquid crystal display device of claim 2, wherein the electrode pattern on the opposed substrate portion extending further from the fold line is a signal electrode pattern and the electrode pattern on the other planar portion is a common electrode pattern, the common electrode pattern extending across the fold line to the terminal portion.

4. the liquid crystal display device of claim 3, wherein the electrode patterns on each opposed substrate portion extends substantially parallel to the fold line.

5. The liquid crystal display device of claim 1, wherein the opposed portions of the substrate sheet extend substantially longitudinally transverse to the fold line and one portion includes a terminal portion extending in the direction parallel to the fold line.

6. A liquid crystal display device comprising a folded substrate sheet of flexible material having two opposed, spaced apart and parallel portions and a folded portion therebetween, each parallel portion having transparent electrode patterns disposed thereon and a liquid crystal material disposed in the space between the portions, said folded portion having an inside diameter which is substantially equal to or greater than the thickness of said substrate sheet.

7. A liquid crystal display device comprising a folded substrate sheet of flexible material having two opposed, spaced apart and parallel portions and a folded portion defining a fold line therebetween, cooperating transparent electrode patterns disposed on the opposed portions and liquid crystal material disposed therebetween, the opposed surfaces of said substrate sheet treated for orientation in a single direction prior to folding to define the two opposed substrate portions, the direction of orientation on the surface of said substrate sheet being parallel to said fold line, and the direction of orientation of one parallel portion with respect to the other parallel portion being an angle of 180° plus a multiple of 360°.

8. A multi-layer liquid crystal display device comprising a folded substrate sheet having an upper planar portion and an opposed lower planar portion spaced apart and parallel to each other and at least one parallel intermediate planar portion with a fold line at each end of the intermediate portion to define at least two distinct liquid crystal cells with spaces between opposed planar portions, a sealing material disposed about the perimeter of the opposed portions of the subtrate sheet, liquid crystal material sealed in each space, each facing portion of the substrate sheet having cooperating electrode patterns formed therefor for applying a voltage therebetween across the liquid crystal material to render selected portions visually distinguishable from the remaining material, one of said electrode patterns on one of the facing substrate portions of each cell extending about the fold line between the substrate portions to the other opposed substrate portion.

9. The liquid crystal display device of claim 8, wherein there is one intermediate planar portion disposed between said upper and lower planar portion, said intermediate planar portion having electrodes on both side surfaces and defining a liquid crystal display device having two cells positioned along a line of sight.

10. The liquid crystal display device of claim 8, wherein there are two intermediate planar portions disposed between said upper and lower planar portions, said intermediate planar portions having electrodes defined on both sides thereof, and said planar portions defining a device having three liquid crystal display cells disposed along a line of sight.

11. A liquid crystal display device comprising a folded substrate sheet of flexible material having two opposed, spaced apart and parallel portions and a folded portion defining a fold line therebetween, said folded portion having an elongated opening therein extending along said folded portion, cooperating transparent electrode patterns disposed on the opposed portions and liquid crystal material disposed threbetween.

12. A liquid crystal display device comprising a folded substrate sheet of flexible material having two opposed, spaced apart and parallel portions and a folded portion defining a fold line therebetween, a support member having a cross section which is at least partially curved about which said substrate sheet is folded, cooperating transparent electrode patterns disposed on the opposed portions and liquid crystal material disposed therebetween.

13. The liquid crystal display device of claim 12, wherein said support member has a circular cross section.

14. The liquid crystal display device of claim 12, wherein the support member has an oval cross section.

15. The liquid crystal display device of claim 12, wherein the support member has a substantially triangular cross section with circular contours at corners of the cross section.

16. The liquid crystal display device of claim 12, wherein the support member has a cross section defined by a combination of a straight line and a curved line.

17. A liquid crystal display device comprising a folded substrate sheet of flexible material having two opposed, spaced apart and parallel portions and a folded portion defining a fold line therebetween, planes each defining a part of an outside surface of said parallel portions adjacent said folded portion, said folded portion projecting beyond only one said plane, cooperating transparent electrode patterns disposed on the opposed portions and liquid crystal material disposed therebetween.

18. A liquid crystal display device comprising a folded substrate sheet of flexible material having two opposed, spaced apart and parallel portions and a folded portion defining a fold line therebetween, a plane defining at least a portion of an outside surface of a first of the parallel portions adjacent the folded portion, cooperating transparent electrode patterns disposed on the opposed portions and liquid crystal material disposed therebetween, a polarizer affixed to the first parallel portion, the polarizer having an outer planar surface at a first distance from the plane, said first distance being greater than a second distance by which the folded portion extends beyond the plane.

19. A liquid crystal display device comprising a folded substrate sheet of flexible material having two opposed, spaced apart and parallel portions and a folded portion defining a fold line therebetween, cooperating transparent electrode patterns disposed on the opposed portions and liquid crystal material disposed therebetween, at least a portion of said electrode patterns being of a matrix type, a first part of at least one electrode of said electrode patterns being parallel to the folded portion and a second part of said at least one electrode of the electrode pattern being disposed at an angle with respect to the folded portion.

20. The liquid crystal display device of claim 19, wherein the second part of said electrode is curved.

21. The liquid crystal display device of claim 19, wherein the second part of said electrode is circular.

22. The liquid crystal display device of claim 19, further comprising a display area plated with an electroless nickel in regions of said display area removed from said electrode patterns.

23. A liquid crystal display device comprising a folded substrate sheet of flexible material having two opposed, spaced apart and parallel portions and a folded portion defining a fold line therebetween, a portion of said substrate being a polarizer, cooperating transparent electrode patterns disposed on the opposed portions and liquid crystal material disposed therebetween.

24. The liquid crystal display device of claim 19, wherein at least one additional electrode of said electrode patterns extends in a direction perpendicular to said folded portion.

25. The liquid crystal display device of claim 19, wherein the second part of at least one electrode extends perpendicular to the folded portion.

26. The liquid crystal display device of claim 25, further comprising, at least one other electrode of the electrode patterns having a first part parallel to the folded portion and a second part perpendicular to the folded portion.

27. The liquid crystal display device of claim 26, wherein the portion of said electrode patterns defines a matrix display area.

28. The liquid crystal display device of claim 26, wherein the portion of said electrode patterns defines a matrix display area, said first part of said at least one electrode extends in a first direction from said display area and said first part of said at least one other electrode extends in a second direction from said display area, said second direction being opposite said first direction.

29. The liquid crystal display device of claim 28, further comprising, at least one additional electrode of said electrode pattern extending in a direction perpendicular to said folded portion, a part of said at least one additional electrode extending into said display area.

30. The liquid crystal display device of claim 19, wherein the portion of said electrode patterns defines a matrix display area, and the second part of the at least one elextrode extends perpendicular to the folded portion and about said fold line, further comprising at least one other electrode of the electrode patterns having a first part parallel to the folded portion and a second part extending perpendicular to the folded portion and about said fold line, the first part of the at least one electrode and the first part of the at least one other electrode extending into said display area.

* * * * *